(12) United States Patent
Krejci

(10) Patent No.: US 11,878,694 B2
(45) Date of Patent: Jan. 23, 2024

(54) VEHICLE SAFETY SYSTEM

(71) Applicant: Andy Krejci, Lincoln, NE (US)

(72) Inventor: Andy Krejci, Lincoln, NE (US)

( * ) Notice: Subject to any disclaimer, the term of this patent is extended or adjusted under 35 U.S.C. 154(b) by 0 days.

(21) Appl. No.: 16/909,966

(22) Filed: Jun. 23, 2020

(65) Prior Publication Data
US 2020/0398853 A1    Dec. 24, 2020

Related U.S. Application Data

(60) Provisional application No. 62/865,656, filed on Jun. 24, 2019.

(51) Int. Cl.
| | |
|---|---|
| *B60W 40/04* | (2006.01) |
| *G06F 13/24* | (2006.01) |
| *B60W 50/14* | (2020.01) |
| *G01S 5/16* | (2006.01) |
| *G01S 5/18* | (2006.01) |

(52) U.S. Cl.
CPC ............ *B60W 40/04* (2013.01); *B60W 50/14* (2013.01); *G06F 13/24* (2013.01); *G01S 5/16* (2013.01); *G01S 5/18* (2013.01)

(58) Field of Classification Search
CPC ....... B60W 40/04; B60W 50/14; G06F 13/24; G01S 5/16; G01S 5/18; G06K 9/209; G06K 9/00805
See application file for complete search history.

(56) References Cited

U.S. PATENT DOCUMENTS 9,478,075 B1 * 10/2016 Toutant .................... G07C 5/08
2015/0326829 A1 * 11/2015 Kurihara ................ H04N 7/181
348/148
(Continued)

FOREIGN PATENT DOCUMENTS

DE         102009031087 A1 *  3/2010  ............... B60Q 3/10

OTHER PUBLICATIONS

"Banner Engineering SMB30UR" catalog page, obtained from Wayback machine Mar. 9, 2019 https://www.alliedelec.com/product/banner-engineering/smb30ur/70322550/ (Year: 2019).*
(Continued)

*Primary Examiner* — Peter D Nolan
*Assistant Examiner* — Tanya C Sienko
(74) *Attorney, Agent, or Firm* — Baird Holm LLP

(57) ABSTRACT

A 360 safety system for automated verification of a 360 walk-around prior to vehicle engagement is described. The 360 safety system includes at least three sensors that receive a signal from a transmission fob, where one signal may be received by one of the at least three sensors at a time. The signals received by the at least three sensors are configured to be signal inputs to an operating system, where the operating system is in electrical communication with the at least three sensors. Each signal input received by one of the at least three sensors is processed by the operating system to generate a verification output displayed on a HMI of the operating system. When the CPU determines a valid signal input of each of the at least three sensors has been stored, the operating system processes the signal inputs and generates outputs that permit engagement of the vehicle.

3 Claims, 25 Drawing Sheets

(56) References Cited

U.S. PATENT DOCUMENTS

| | | | | |
|---|---|---|---|---|
| 2016/0236616 A1* | 8/2016 | Kurihara | ............... | G01S 7/40 |
| 2017/0018128 A1* | 1/2017 | Berezin | ............. | G07C 9/00309 |
| 2020/0284913 A1* | 9/2020 | Amelot | ............... | B60W 50/14 |

OTHER PUBLICATIONS

"Instructions for the Vertical and Lateral Alignment of Bendix Radar Sensors" (Service Data sheet) (Year: 2011).*

Part of catalog from MatBotix, obtained from Wayback machine Jul. 13, 2018 https://www.maxbotix.com/Ultrasonic_Sensors.htm (Year: 2018).*

Turn-Key Passive Entry/Passive Start Solution brochure from Atmel (Automotive Compilation vol. 10 pp. 29-35) Accessed at www.atmel.com (Year: 2013).*

* cited by examiner

Fig. 2a
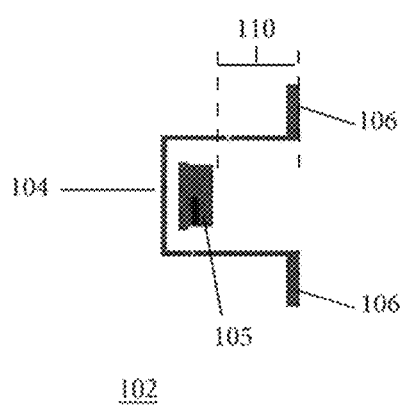
Fig. 2d
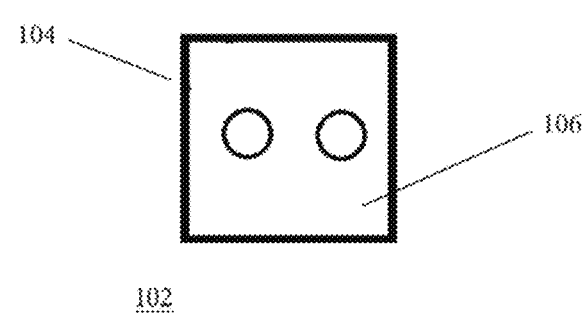
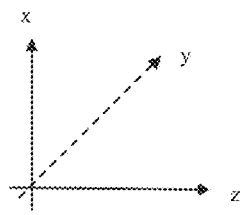

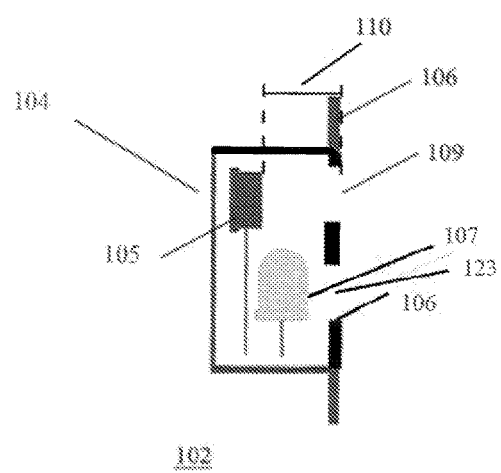
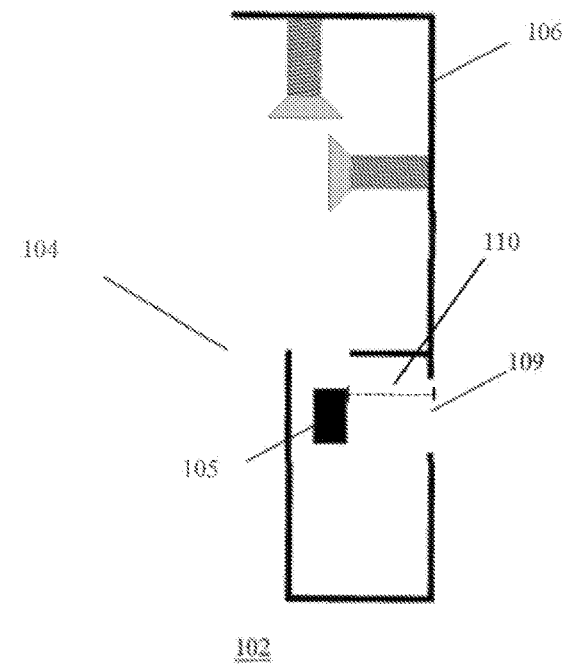
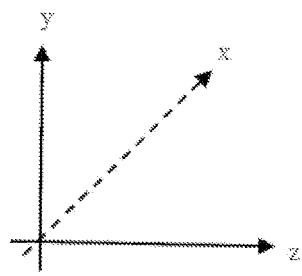

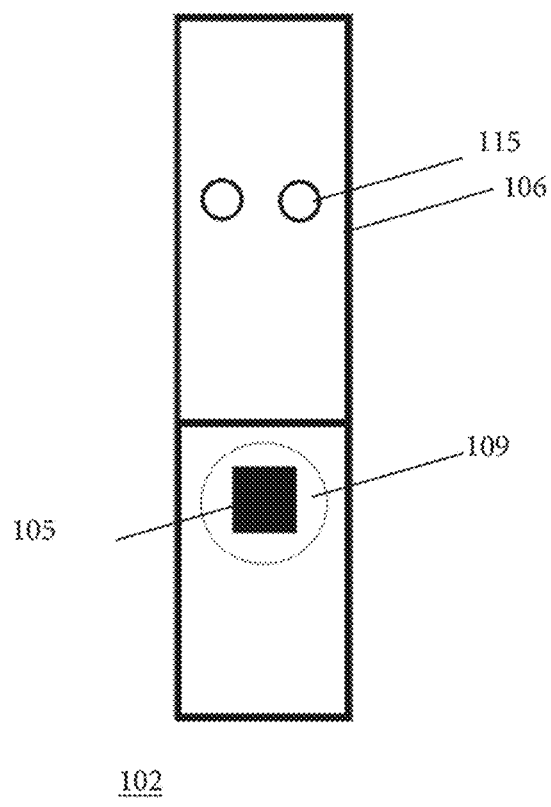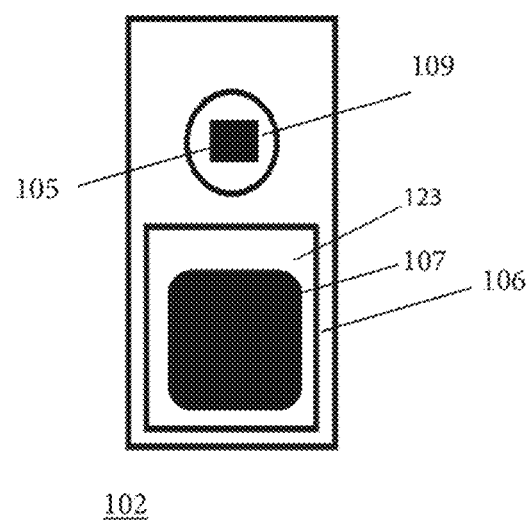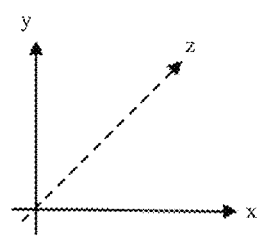

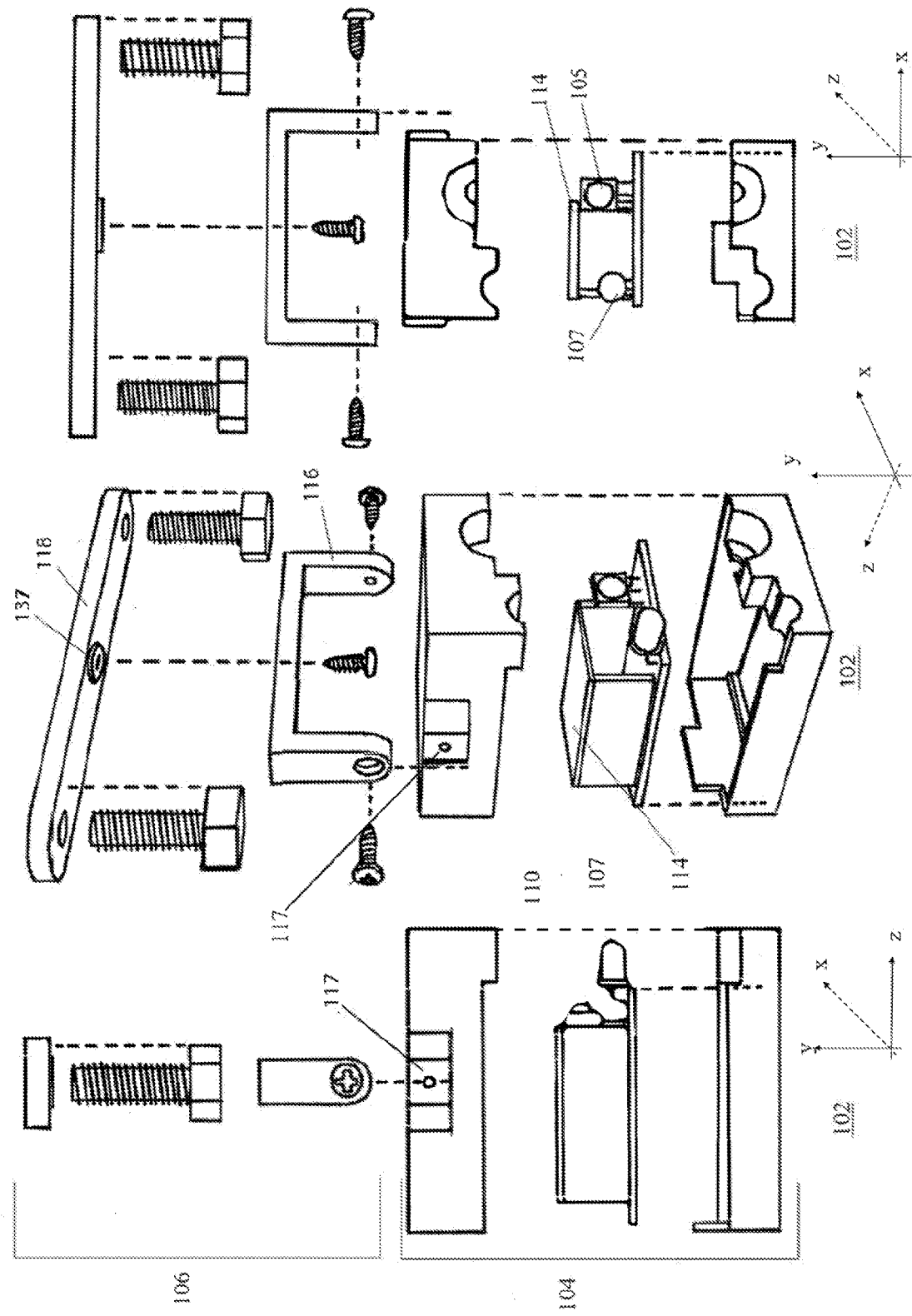

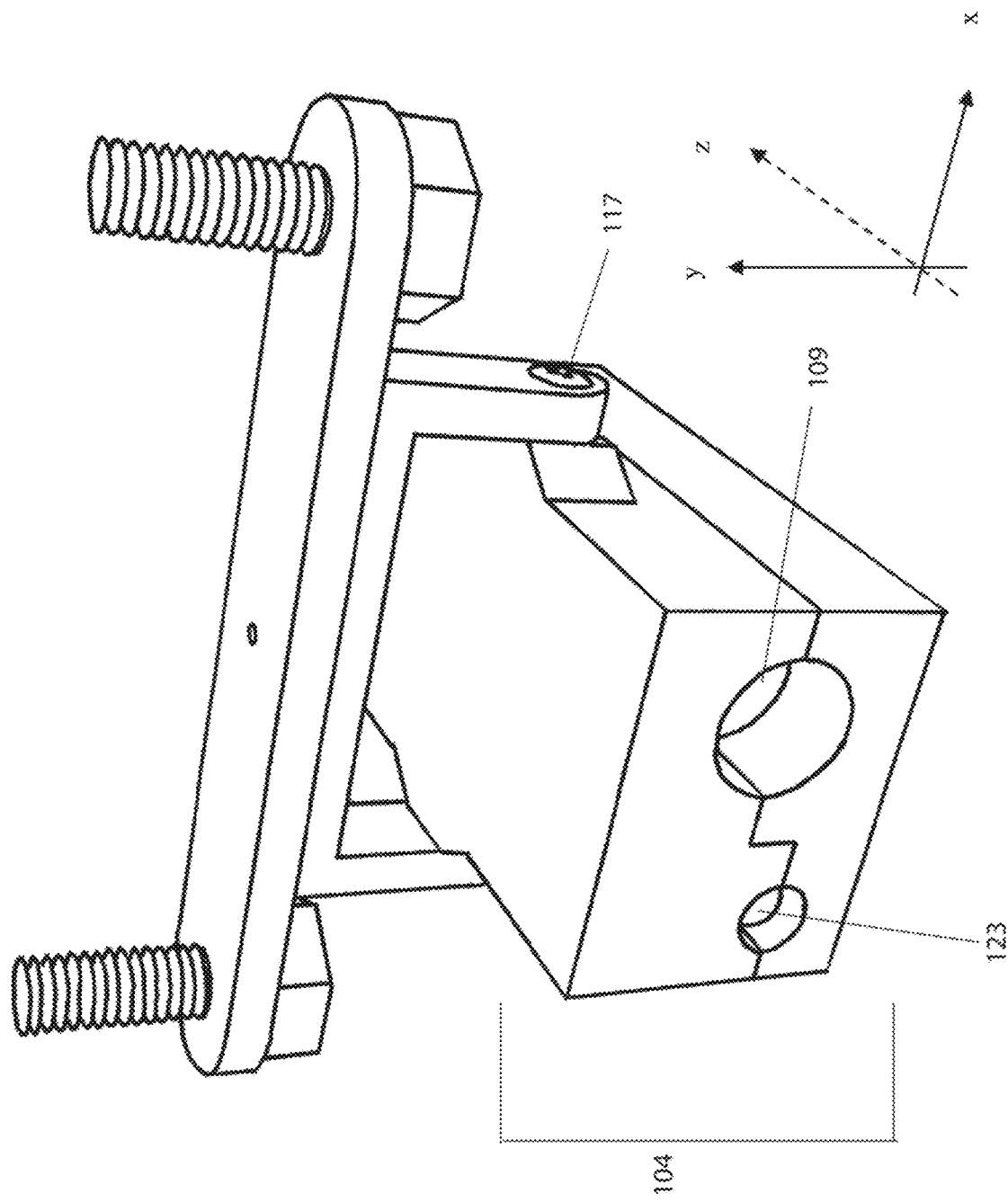

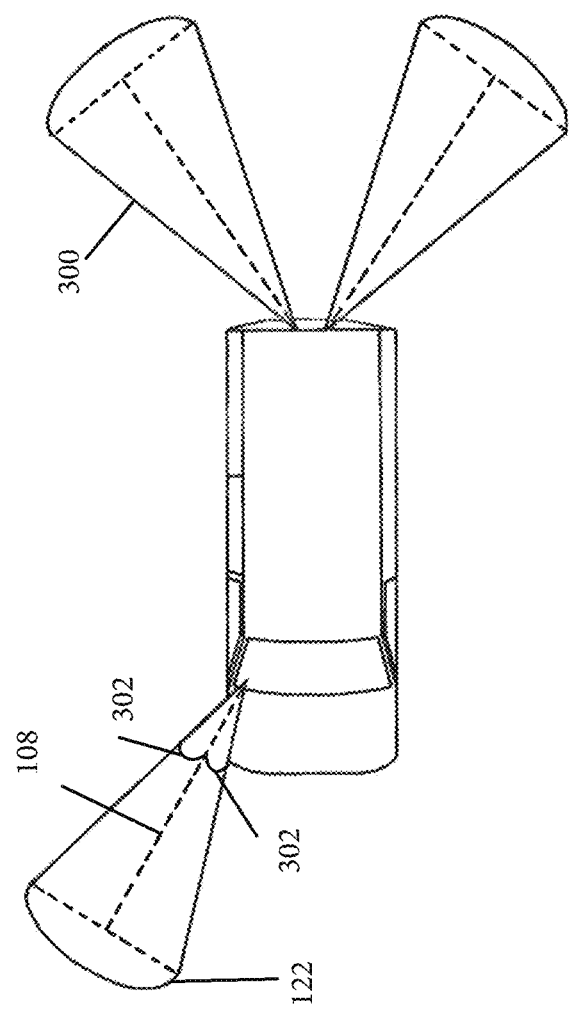

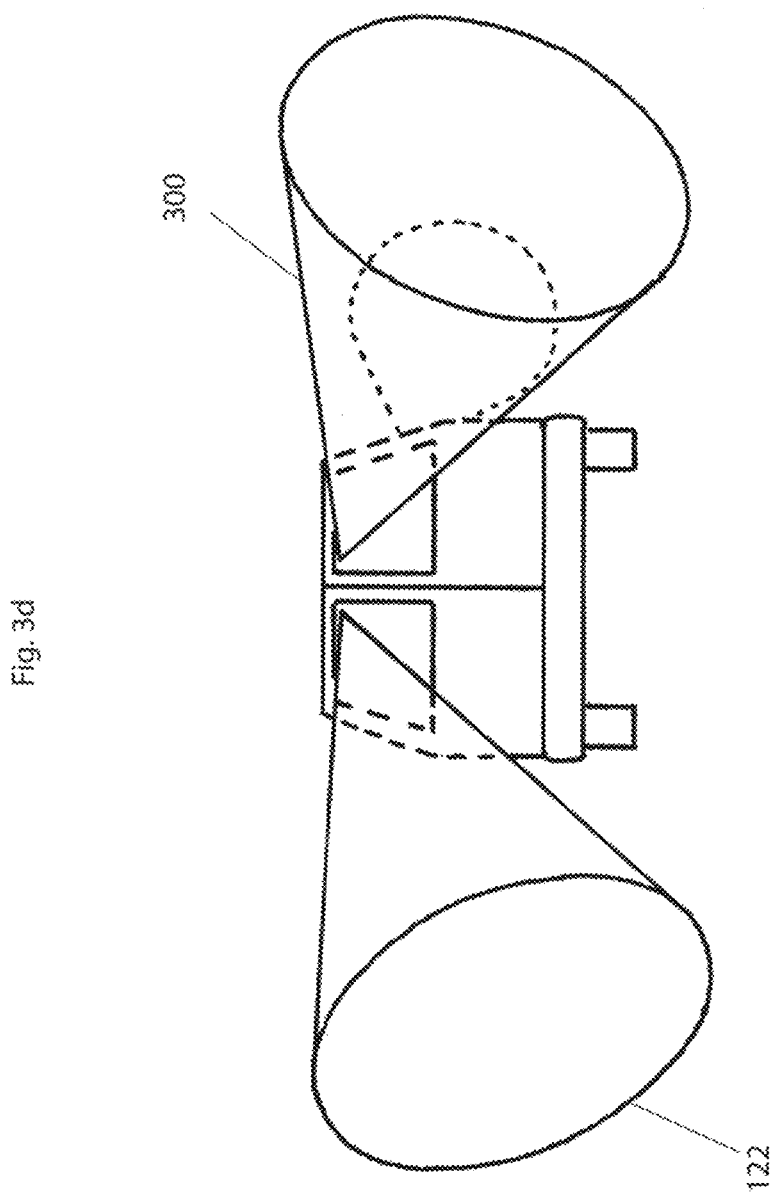

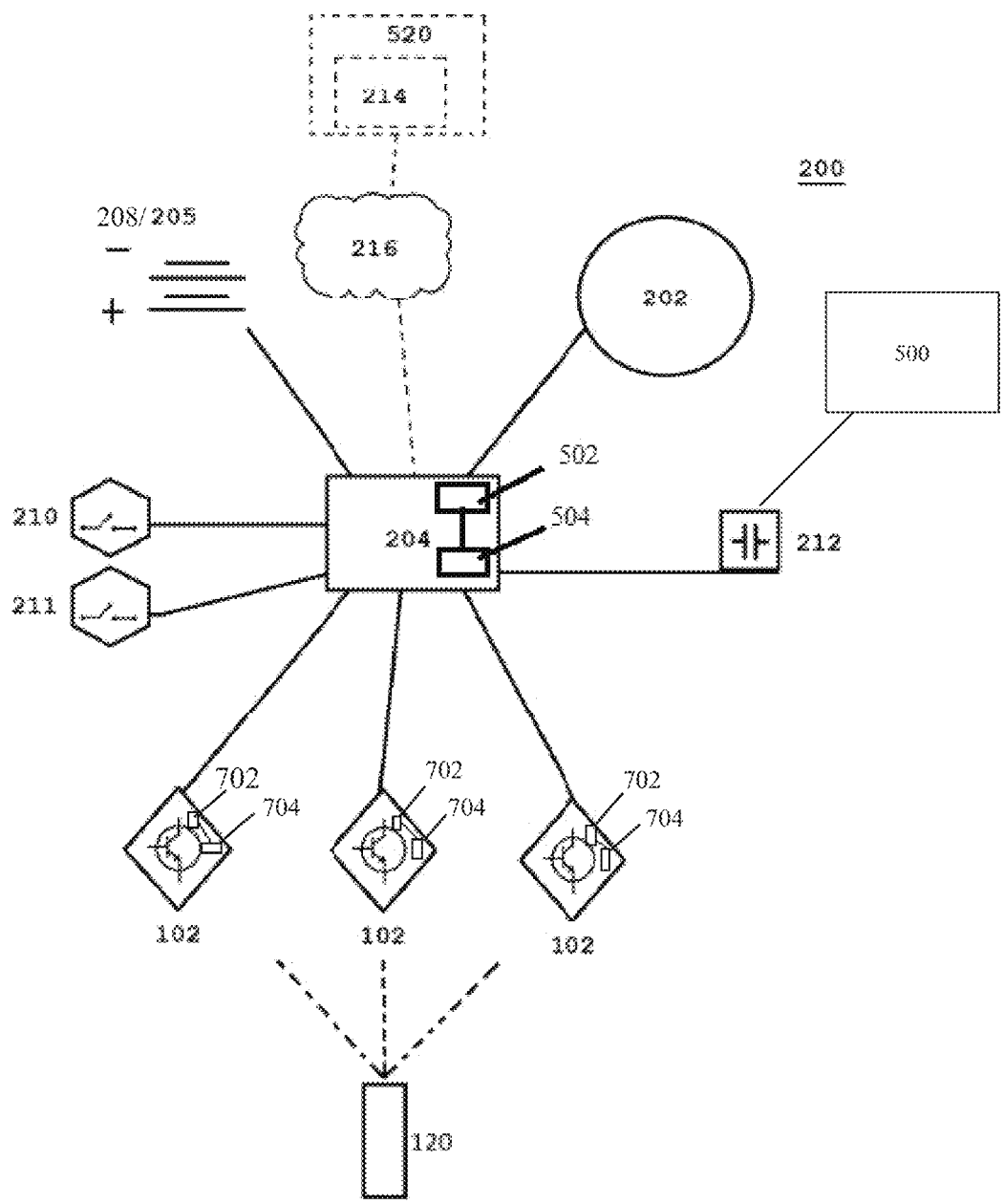

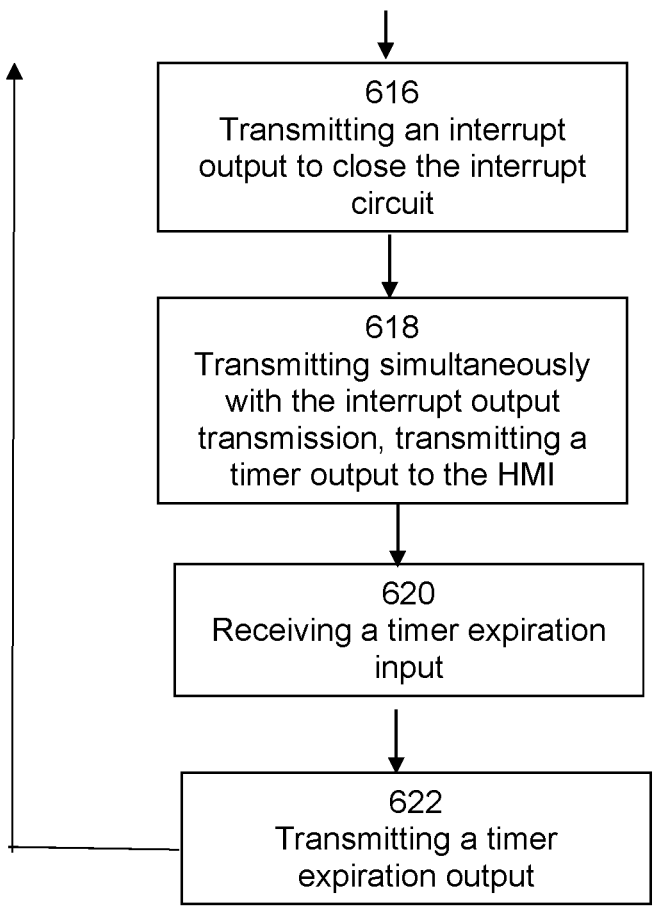

Fig. 7a
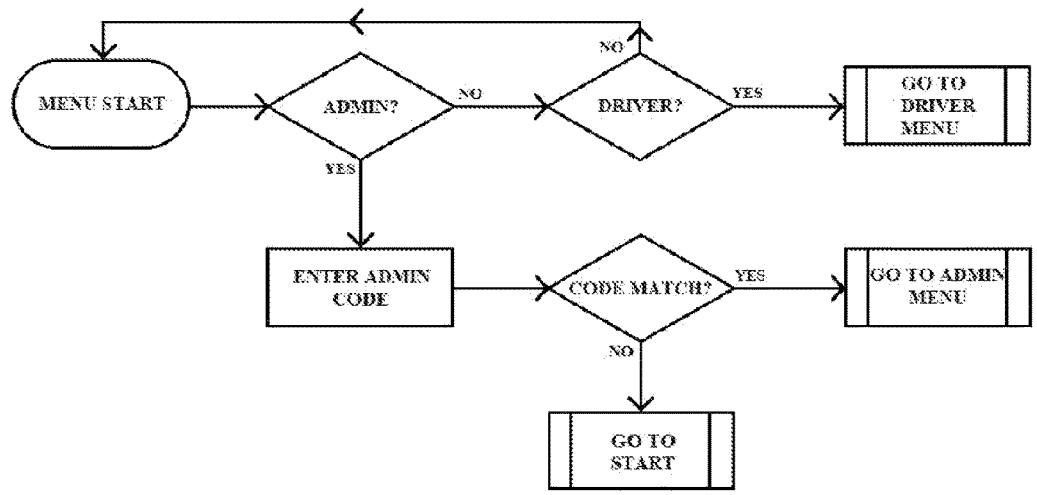
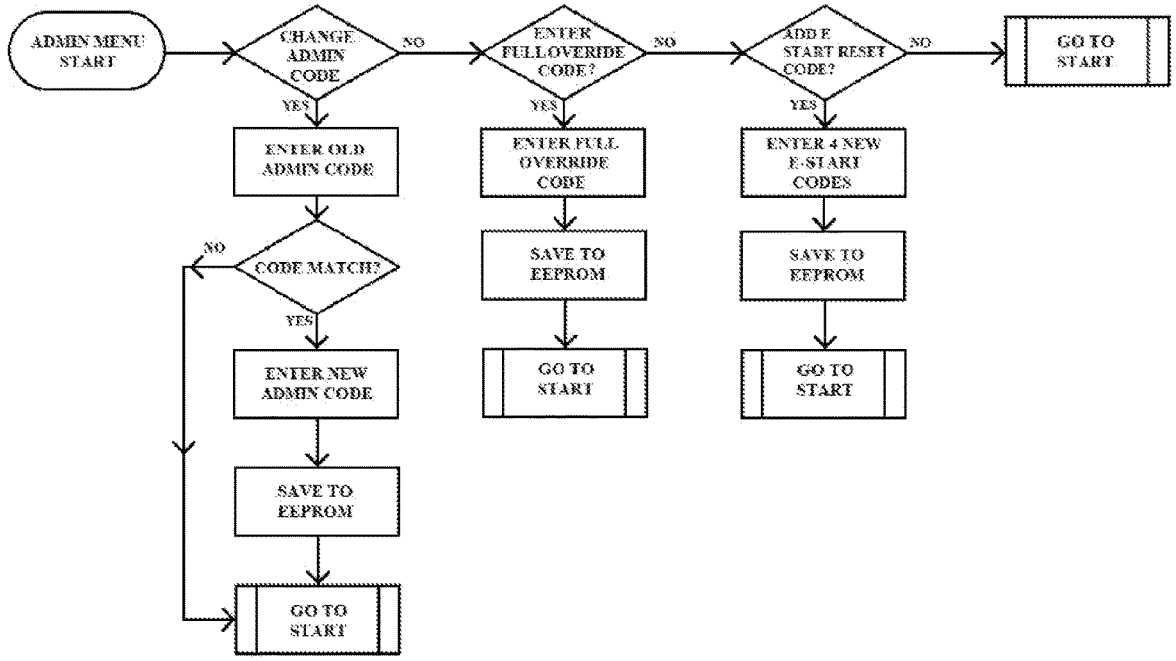

VEHICLE SAFETY SYSTEM

This application claims the benefit of priority to U.S. Provisional Patent Application No. 62/865,656 filed Jun. 24, 2019, entitled "VEHICLE SAFETY SYSTEM" which is incorporated by reference in its entirety.

BACKGROUND

Heavy machinery and motorized vehicles associated for use in a regulated environment (e.g. Occupational Safety and Health Administration regulations) are commonly the source of injury in the workplace and damage to property. These injuries may arise from improper, incomplete, or failed inspection of the heavy machinery or motorized vehicle (i.e. vehicle) prior to the operation of the vehicle. For example, if a driver of a vehicle fails to inspect vehicle tires, the conditions of the rear of the vehicle, including obstructions, peoples, proper attachment of towing apparatus, or visible issues to the vehicle, prior to operation of the vehicle, damage to property or persons may occur.

In order to reduce injuries and property damage associated with vehicles, federal and state regulations, as well as company safety policies and procedures, require drivers to inspect the vehicle and its accompanying surroundings in a 360 degree manner prior to driving the vehicle (i.e. 360 walk-around). A 360 walk-around includes the driver inspecting the vehicle and the immediate surrounding for any hazards by walking completely around the vehicle. The 360 walk-around allows a driver to identify hazards that would not be visible from the mirror views of the driver's seat of the vehicle or the camera views provided by a back-up camera or a series of cameras around the vehicle.

While inspection of a vehicle and its surroundings prior to operation is typically mandated either by law or company policy, conventional methods for inspection are deficient. Conventional methods for inspection include a driver performing the 360 walk-around of the vehicle and manually verifying the 360 walk-around, such as through pen and paper or a mobile computer device. This manual inspection and entry of verification provides ample opportunity for the 360 walk-around to be improper, incomplete, or not done at all, as the driver may verify inspection without actually performing the 360 walk-around.

It is therefore desirable to have a 360 safety system that does not provide manual verification of a 360 walk-around, and rather the 360 walk-around is verified in an automated manner with minimal opportunity for manual override. It is further desirable that the 360 safety system prohibit ignition, shifting, and/or full functionality of the vehicle prior to automated verification of the 360 walk-around.

SUMMARY

In aspects of a 360 safety system to verify the safety of a vehicle prior to engaging the vehicle, the 360 safety system including a regulated vehicle; at least three sensors removably attached to the vehicle, the at least three sensors each comprising a bracket having a bracket opening and a bracket depth, a receiver having a transmission depth, where the transmission depth is the distance from 3.05 meters or less that the receiver receives a signal from a transmission fob, wherein the receiver is housed by the bracket distal to and centered within the bracket opening, a means for removable attachment of the bracket to the vehicle; and a zone of detection formed by two angles and the transmission depth, the two angles comprising the two angles from a centerline of the receiver and the bracket opening, where the two angles are each from 16.7 degrees or less, wherein each of the zones of detection of the at least three sensors do not overlap, where only the receiver of one of the at least three sensors receives the signal transmitted from the transmission fob within the zone of detection of the receiver.

In aspects of a 360 safety system to verify safety of the vehicle by completing a 360 walk-around prior to engaging the vehicle, the 360 safety system including a regulated vehicle; at least three sensors removably attached to the vehicle, the at least three sensors each comprising a bracket having a bracket opening and a bracket depth, a receiver having a transmission depth, where the transmission depth is the distance from 3.05 meters or less that the receiver receives a signal from a transmission fob, wherein the receiver is housed by the bracket distal to and centered within the bracket opening, an adhesion brim for removable attachment of to the vehicle; and a zone of detection formed by two angles and the transmission depth, the two angles comprising the two angles from a centerline of the receiver and the bracket opening, where the two angles are each from 16.7 degrees or less, wherein each of the zones of detection of the at least three sensors do not overlap, where only the receiver of one of the at least three sensors receives the signal transmitted from the transmission fob within the zone of detection of the receiver; and an operating system configured to operate the 360 safety system, the operating system comprising a CPU (central processing unit) having a processor and a storage medium, the CPU in electrical communication with the at least three sensors configured to receive, process, and store signal inputs from the at least three sensors, receive, process, and store user inputs from an HMI (Human-Machine Interface), receive and process a key input from a key position input, receive and process a headlight input from a headlight detection input, provide an interrupt output to an interrupt, and provide outputs to the HMI; an HMI in electrical communication with the CPU configured to receive inputs for transmission to the CPU and display outputs from the CPU; a key position input configured to determine and transmit the position of a key of the vehicle via the key input to the CPU; a headlight detection input configured to determine and transmit the headlight input of the vehicle to the CPU when the vehicle's headlights are on; and an interrupt configured to provide a complete circuit when closed via the interrupt output from the CPU upon completion of the 360 walk-around to engage the vehicle, where the interrupt is in electrical communication with the CPU.

In aspect of the 360 safety system, a method of operating a 360 safety system to verify safety of a vehicle by completing a 360 walk-around prior to engaging the vehicle, the method including initiating the 360 walk-around of the 360 safety system by receiving a key input at a CPU of an operating system of the 360 safety system, the 360 safety system comprising a regulated vehicle; at least three sensors removably attached to the vehicle, the at least three sensors each comprising a bracket having a bracket opening and a bracket depth, a receiver having a transmission depth, where the transmission depth is the distance from 3.05 meters or less that the receiver receives a signal from a transmission fob, wherein the receiver is housed by the bracket distal to and centered within the bracket opening, a light emitting diode (LED); and a means for removable attachment to the vehicle; and a zone of detection formed by two angles and the transmission depth, the two angles comprising the two angles from a centerline of the receiver and the bracket opening, where the two angles are each from 16.7 degrees or less, wherein each of the zones of detection of the at least three sensors do not overlap, where only the receiver of one of the at least three sensors receives the signal transmitted from the transmission fob within the zone of detection of the receiver; and the operating system configured to operate the 360 safety system, the operating system comprising the CPU (central processing unit) having a processor and a storage medium, the CPU in electrical communication with the at least three sensors; an HMI in electrical communication with the CPU configured to receive timer expiration inputs for transmission to the CPU and display timer expiration outputs from the CPU; a key position input configured to determine and transmit the position of a key of the vehicle via a key input to the CPU; a headlight detection input configured to determine and transmit a headlight input of the vehicle to the CPU in response to the headlights of the vehicle being on; and an interrupt configured to provide a complete circuit when closed via an interrupt output from the CPU upon completion of the 360 walk-around to engage the vehicle, where the interrupt is in electrical communication with the CPU; determining receipt of the headlight input from the headlight detection input at the CPU; transmitting via the CPU an activation output to the at least three sensors configured to activate the LED and the receiver; receiving a first signal input at the CPU via a first of the at least three sensors, the first signal input configured for causing the CPU to process the validity of the first signal input and store a valid first signal input in the CPU; transmitting a first sensor deactivation output via the CPU to the first sensor of the at least three sensors configured to deactivate the first of the at least three sensors; receiving a second signal input at the CPU via a second of the at least three sensors, the second signal input configured for causing the CPU to process the validity of the second signal input and store a valid second signal input in the CPU; transmitting a second sensor deactivation output via the CPU to the second sensor of the at least three sensors configured to deactivate the second of the at least three sensors; receiving a third signal input at the CPU via a third of the at least three sensors, the signal input configured for causing the CPU to process the validity of the third signal input and store a valid third signal input in the CPU; transmitting a third sensor deactivation output via the CPU to the third sensor of the at least three sensors configured to deactivate the third of the at least three sensors; determining the first valid signal input, second valid signal input, and third valid signal input are stored in the CPU, the determining configured to store the completion of the walk-around in the CPU; and transmitting an interrupt output to the interrupt via the CPU configured to close the interrupt circuit allowing engagement of the vehicle.

FIGURES

FIG. 2a represents a top view of one of the at least three sensors of the 360 safety system having an adhesive adhesion brim that is a fixed brim.

FIG. 2b represents a side view of one of the at least three sensors of the 360 safety system having an adhesive adhesion brim that is a fixed brim.

FIG. 2c represents a front view of one of the at least three sensors of the 360 safety system having an adhesive adhesion brim that is a fixed brim.

FIG. 2d represents a top view of one of the at least three sensors of the 360 safety system having a screw or bolt adhesive brim that is a fixed brim.

FIG. 2e represents a side view of one of the at least three sensors of the 360 safety system having a screw or bolt adhesive brim that is a fixed brim.

FIG. 2f represents a front view of one of the at least three sensors of the 360 safety system having a screw or bolt adhesive brim that is a fixed brim.

FIG. 2g represents a front exploded view of one of the at least three sensors of the 360 safety system having an adhesion brim that is a pivot brim.

FIG. 2h represents a perspective exploded view of one of the at least three sensors of the 360 safety system having an adhesion brim that is a pivot brim.

FIG. 2i represents a side exploded view of one of the at least three sensors of the 360 safety system having an adhesion brim that is a pivot brim.

FIG. 2j represents a perspective view of one of the at least three sensors of the 360 safety system having an adhesion brim that is a pivot brim.

FIG. 3b represents a top view of zones of detection of at least three sensors of the 360 safety system in a conical representation.

FIG. 3d represents a rear view of the zones of detection of the at least three sensors of the 360 safety system in a conical representation.

FIG. 5 represents the operating system of the 360 safety system.

FIG. 7a represents an example of programming associated with entry of the administrator code.

FIG. 7b represents an example of programming associated with

DETAILED DESCRIPTION

A 360 safety system for automated verification of a 360 walk-around prior to vehicle engagement (e.g. ignition or gear shifting) to ensure the vehicle and surrounding are safe for the vehicle to be moved is described. The 360 safety system includes at least three sensors that receive a signal from a transmission fob, where one signal may be received by one of the at least three sensors at a time. The signals received by the at least three sensors are configured to be signal inputs to an operating system, where the operating system is in electrical communication with the at least three sensors. Each signal input received by one of the at least three sensors is processed by the operating system and may generate a verification output displayed on a HMI of the operating system. When each of the at least three sensors has received a signal from a transmission fob, the operating system processes the signal inputs and generates outputs that permit engagement of the vehicle.

Figure 1:
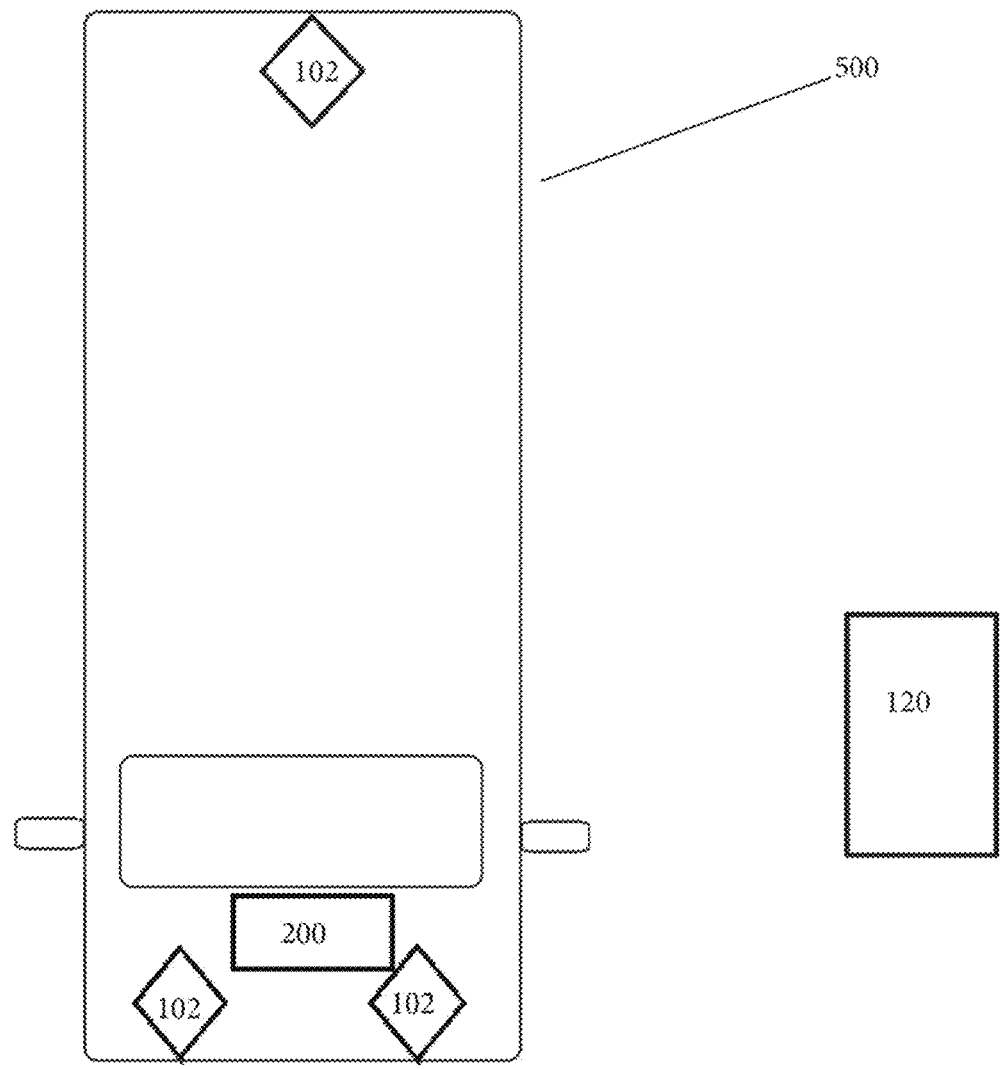
FIG. 1 represents a 360 safety system.

FIG. 1 represents a 360 safety system 100 for automated verification of a 360 walk-around prior to vehicle engagement. The 360 safety system 100 includes at least three sensors 102, a transmission fob 120, and an operating system 200. The at least three sensors are placed on a vehicle 500, such as heavy machinery (i.e. machinery that may be motorized or non-motorized) or motorized vehicles both used in connection with federal or state regulated activities and/or subject to safety policies or procedures imposed by the owner of the vehicle 500 (i.e. a regulated vehicle).

The at least three sensors 102 are removably attached to the vehicle 500 and are in electrical communication with the operating system 200. The at least three sensors 102 may be in hardwire or wireless electrical communication with the CPU 204. When the at least three sensors 102 are in hardwire electrical communication with the CPU 204 it may be via a communication wire of communication lights (i.e. turn signal or hazard lights) of the vehicle 500. The at least three sensors 102 are in hardwire electrical communication with a component of the vehicle to supply power, such as the headlights. The at least three sensors 102 are in hardwire electrical communication with the vehicle frame to ground the at least three sensors 102. The at least three sensors 102 have a zone of detection 300 (see FIGS. 3a-3e), a receiver 105 (see FIGS. 2a, 2b, and 2g-2i), and a bracket 104 (see FIGS. 2a-2d, and 2g-2j). The at least three sensors 102 may include an adhesion brim 106, a light emitting diode (LED) 107, and a sensor CPU 114 (see FIGS. 2a, 2b, and 2g-2i).

The receiver 105 of the at least three sensors 102 receives the signal from the transmission fob 120. The receiver 105 may be an infrared optic receiver or sonic receiver that corresponds to the signal (e.g. wavelength) transmitted by the transmission fob 120. The receiver 105 may have a transmission depth 108 from 3.05 meters (10 feet) or less. The transmission depth 108 is the maximum distance measured from the receiver 105 to the transmission fob 120, wherein the receiver 105 may receive the signal when transmitted by the transmission fob 120.

Figure 3A:
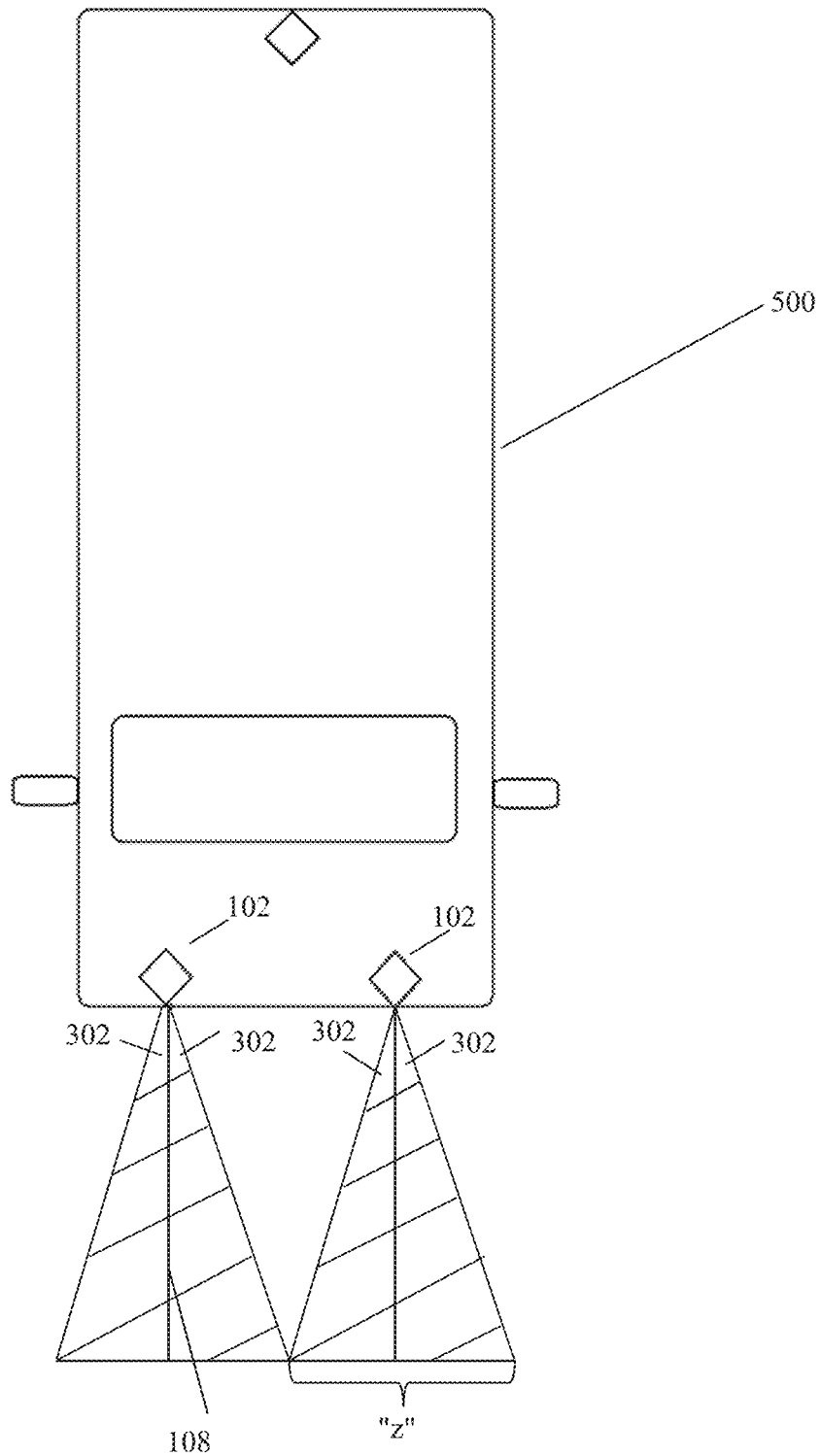
FIG. 3a represents a zone of detection of two of the at least three sensors of the 360 safety system.

The transmission fob 120 of the 360 safety system 100 transmits a signal to be received by one of the at least three sensors 102. The transmission fob 120 may be an infrared transmitter or sonic transmitter that produces the signal corresponding to the receiver 105 of the at least three sensors 102. The transmission fob 120 may be of a size that is handheld. For example, in order for the transmission fob 120 to send the signal with successful receipt by the receiver 105 of one of the at least three sensors 102, the transmission fob 120 must be within one of two angles 302, the transmission depth 108, and a transmission circumference 122, where together these boundaries define the zone of detection 300 (as shown in FIG. 3a).

FIG. 2a and FIG. 2d represents a top view of one of the at least three sensors 102. FIG. 2b, FIGS. 2e, and 2i represents a side view of one of the at least three sensors 102. FIG. 2c, FIG. 2f, and FIG. 2g represent a front view of one of the at least three sensors. FIG. 2h represents an exploded perspective view of one of the at least three sensors 102. FIG. 2j represents a perspective view of one of the at least three sensors 102. The bracket 104 of the at least three sensors 102 includes a bracket opening 109 and a bracket depth 110. The bracket 104 partially surrounds and houses the receiver 105 distal to and centered within the bracket opening 109.

The receiver 105 is housed in the bracket 104 such that it is substantially perpendicular to the vehicle 500 when one of the at least three sensors 102 is removably attached to the vehicle 500 when the adhesion brim 106 is a fixed brim (see FIGS. 2a-2f). The receiver 105 is housed in the bracket 104 such that it may be from plus or minus 55 degrees from perpendicular (i.e. along the y-axis) to the vehicle 500 when the adhesion brim 106 is a pivot brim (see FIGS. 2g-2j). Further, the receiver may be rotated 360 degrees (along the x-axis) when the adhesion brim 106 is a pivot brim). The bracket may further house the LED 107 visible through an LED opening 123, where the LED opening 123 is of a shape and size that permits the LED 107 to be visible through the opening. The bracket may be of any non-reflective material such as plastic, metal, or rubber. The bracket opening 109 is from 2 to 9 millimeters. The bracket depth 110 is from 4 to 14 millimeters.

The adhesion brim 106 of the at least three sensors 102 removably attaches the at least three sensors 102 to the vehicle 500. The adhesion brim 106 may be a fixed brim where the receiver remains in a fixed substantially perpendicular position relative to the vehicle 500 (see FIGS. 2a-2f). The adhesion brim 106 may be a pivot brim where the receiver may be pivoted from plus or minus 55 degrees from perpendicular to the vehicle 500 (see FIG. 2g-2j). The adhesion brim may be formed as a part of the bracket 104, such as when the adhesion brim 106 is a fixed brim.

Further, the adhesion brim may be a means for removably attaching the at least three sensors 102 to the vehicle to allow pivoting of the receiver 105 from plus or minus 55 degrees from perpendicular to the vehicle 500. For example, as shown in FIGS. 2g-2j, the means for removably attaching the at least three sensors includes a screw attachment of the bracket 104 to a pivot 116, and screw attachment of the pivot 116 to a plate 118, where the bracket 104 pivots from each of two pivot points 117 of the adhesion brim 106 around the y-axis. Further, the pivot 116 may be in screw attached to the plate 118 at the x-axis pivot point 137. The screw attachment of the bracket 104 to the pivot 116 at the pivot points 117 allows for rotational movement (e.g. pivoting) of the bracket around the y-axis, where the receiver may be positioned from plus or minus 55 degrees from perpendicular to the vehicle 500. The screw attachment of the pivot 116 to the plate 118 at the x-axis pivot point 137 allows for rotational movement of the bracket around the x-axis, where the receiver 105 may be positioned at any of 360 degrees around the x-axis in relation to the vehicle 500 (see FIG. 3h). The screw attachment of the bracket 104 to the pivot 116 at the pivot points 117 provides that rotational movement of the bracket 104 does not occur when the vehicle 500 is under movement.

The adhesion brim 106 may be removably attached to the at least three sensors 102 to the vehicle 500, such as through adhesive, screws, or bolts. FIGS. 2a, 2b, and 2c represents an adhesive adhesion brim 106 that is a fixed brim, where the adhesive adhesion brim 106 is adjacent to and surrounds the bracket opening 109. The adhesive adhesion brim 106 receives adhesive for removable attachment to the vehicle 500. FIGS. 2d, 2e, and 2f represent a screw and bolt adhesion brim 106 that is a fixed brim, where the adhesion brim 106 extends upward from the bracket opening 109 forming an up-side-down "L" shape (see FIG. 2e). The screw and bolt adhesion brim has one or more adhesion brim holes 115 to receive the screws or bolts for removable attachment of one of the at least three sensors 102 to the vehicle 500.

The LED 107 provides an indication that the signal has been received by the receiver 105 via illumination. The LED 107 is housed by the bracket 104 distal to the LED opening 123. The LED 107 may be in electrical communication with the operating system 200, such as via the sensor CPU 114.

Each of the at least three sensor CPUs (central processing unit) 114 are configured for receiving outputs from and transmitting inputs to the CPU 204 of the operating system 200 via the computer readable non-transient software code and data stored in the storage medium 504. The sensor CPU 114 is further configured for transmitting outputs to the LED 107 and receiving inputs from the receiver 105 and transmitting outputs to the CPU 204. For example, each of the at least three sensor CPUs 114 may transmit (as an output from the sensor CPU 114) the signal inputs to the CPU 204 and receive (as an input to the sensor CPU 114) activation outputs from CPU 204 configured for LED activation of the LED 107 and receiver 105, and receive (as an input to the sensor CPU 114) sensor deactivation outputs from the CPU 204 configured for deactivation of the LED 107 and receiver 105. The sensor CPU 114 includes a sensor processor 702 and a sensor storage medium 704, where the sensor processor 702 and the sensor storage medium 704 are communicatively coupled.

The sensor storage medium 704 may be an electrically erasable programmable read-only memory (EEPROM), a magnetic, optical, or semi-conductor memory, another storage device, or the like. The sensor storage medium 704 may be a fixed memory device, a removable memory device, such as a memory card, remotely accessed, or the like.

FIGS. 3a-3h represent the zone of detection 300 of the at least three sensors 102 from various views. The zone of detection 300 (in connection with the placement on the vehicle 500) of the at least three sensors 102 does not permit more than one of the at least three sensors 102 to receive a signal from a transmission fob 120 at a time (i.e. one signal is received by only one of the at least three sensors 102). The zone of detection 300 (designated by the diagonal lines in FIGS. 3a, 3e, and 3f) includes two angles 302, where the zone of detection extends outward in a conical manner, although this is represented in two dimensions in a triangular manner in FIGS. 3a, 3e, and 3f. The zone of detection is formed by the two angles 302 and the transmission depth 108. At the maximum for the transmission depth 108, an outer edge of the zone of detection is defined by a transmission circumference 122, which is the circumference of the conical zone at the maximum transmission depth 108.

The two angles 302 may be from 16.7 degrees as measured from a centerline 301 (the centerline is a reference line extending out from a center of the receiver 105 perpendicular to a wall of the bracket 104 distal to a bracket opening 109) or less. Preferably, the two angles 302 on each of the at least three sensors 102 are equal. The zone of detection 300 may have two different angles 302 for each of the at least three sensors 102, depending on the placement of the at least three sensors 102 on the vehicle 500 in order to maintain receipt of a signal by only one of the at least three sensors 102 at a time.

The zone of detection 300 may be modified depending on the bracket depth 110 and the bracket opening 109 of the at least three sensors 102, provided that the two angles 302 remains from 16.7 degrees or less. The two angles 302 of zone of detection 300 are directly proportional to the bracket depth 110 and the bracket opening 109. For example, when the bracket depth 110 is 8.7 millimeters, the bracket opening 109 is 5.22 millimeters, and the transmission depth 108 is 3.05 meters (10 feet), the zone of detection 300 provides a 1.83 meter (6 feet) diameter of the transmission circumference 122 (as indicated by "d" in FIG. 3.) at the transmission depth 108 for the zone of detection 300 providing a triangular area of 2.79 square meters and a transmission circumference 122 of 5.74 meters (18.84 feet). With this zone of detection 300 having the transmission circumference 122 of 5.74 meters (18.84 feet) for detection at the transmission depth 108, each one of the at least three sensors 102, must be placed at least 1.83 meters apart, as measured from parallel centerlines 301.

The zone of detection 300 may further be modified depending on the transmission depth 108. The triangular area of the zone of detection 300 is directly proportional to the transmission depth 108. The transmission depth 108 may be modified by the type of receiver 104 in each of the at least three sensors 102, where the receiver permits a maximum transmission depth 108 from 10 feet of less.

Figure 3C:
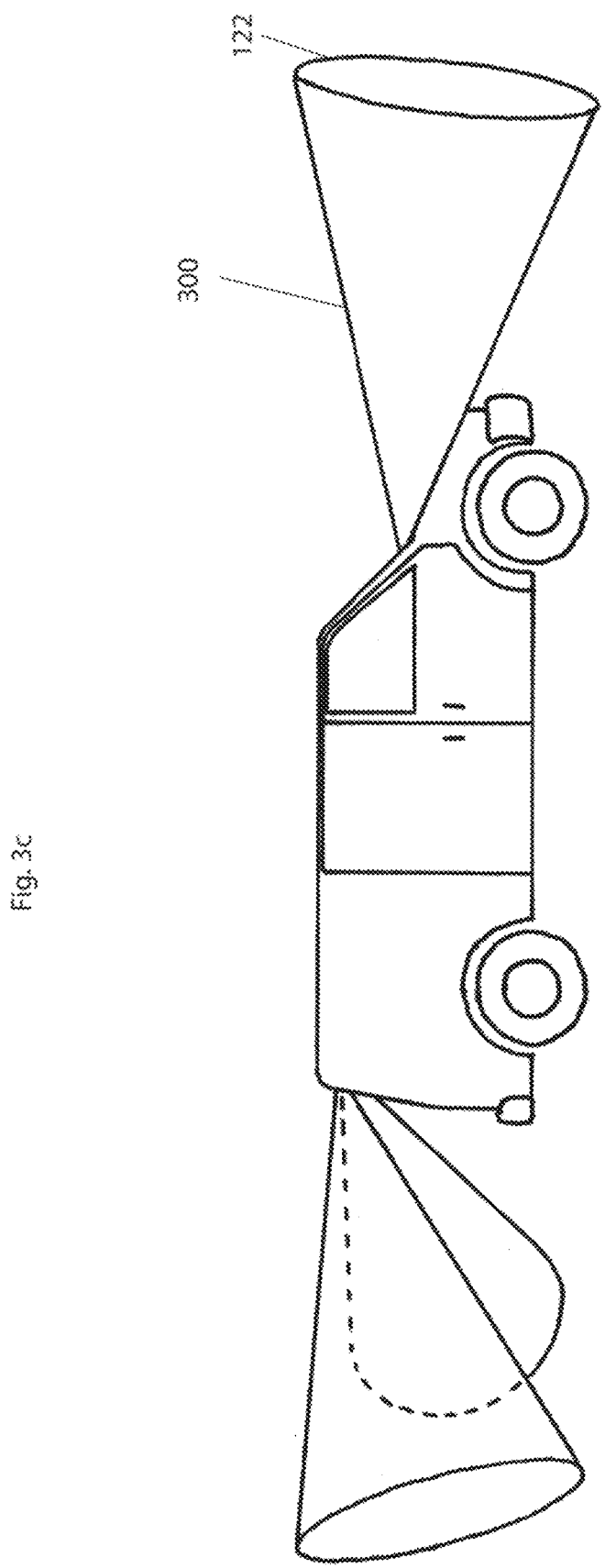
FIG. 3c represents a side view of the zones of detection of the at least three sensors of the 360 safety system in a conical representation.
Figure 3E:
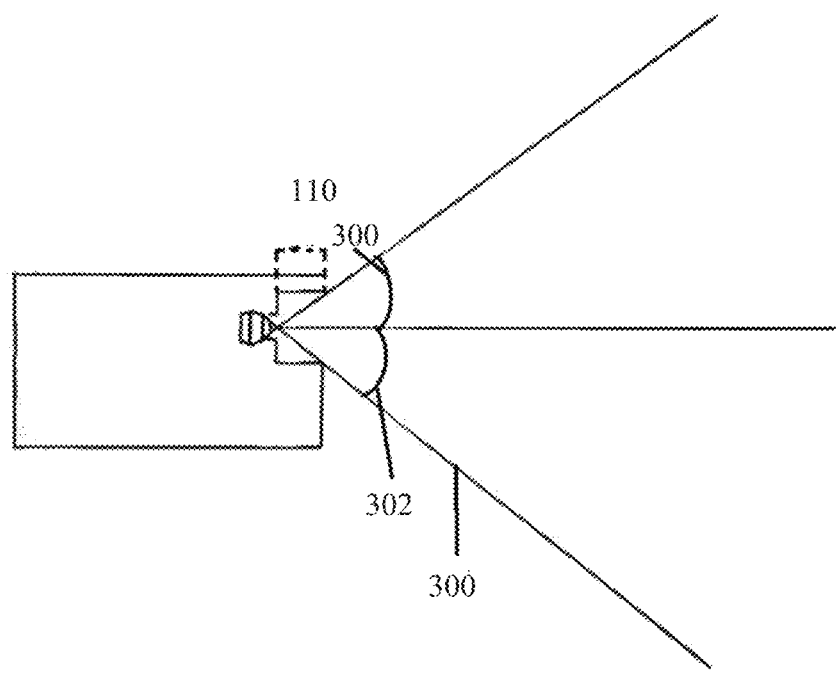
FIG. 3e represents a top view of a zone of detection from a perspective (i.e. as viewed from the sensor) of one of the at least three sensors of the 360 safety system.
Figure 3F:
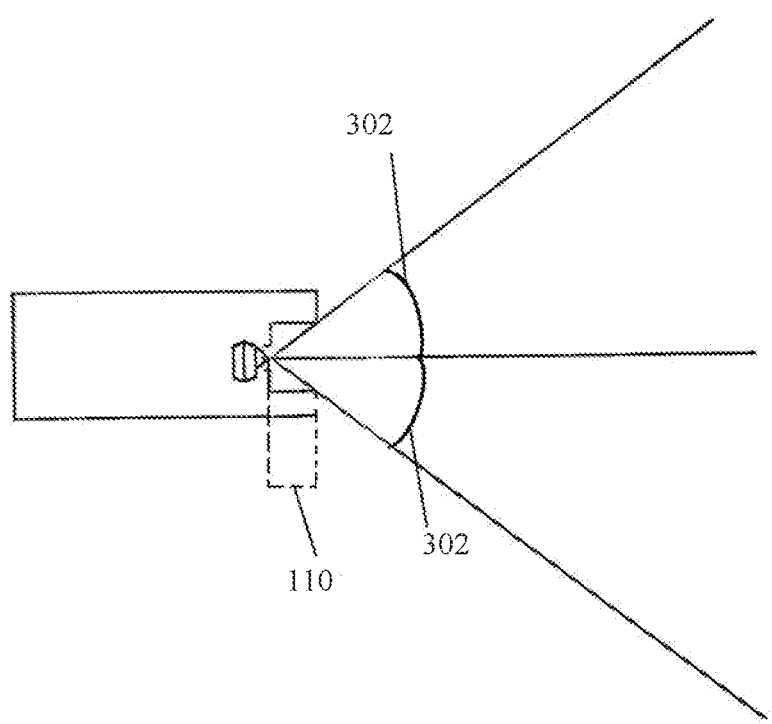
FIG. 3f represents a side view of a zone of detection from the perspective (i.e. as viewed from the sensor) of one of the at least three sensors of the 360 safety system.
Figure 3G:
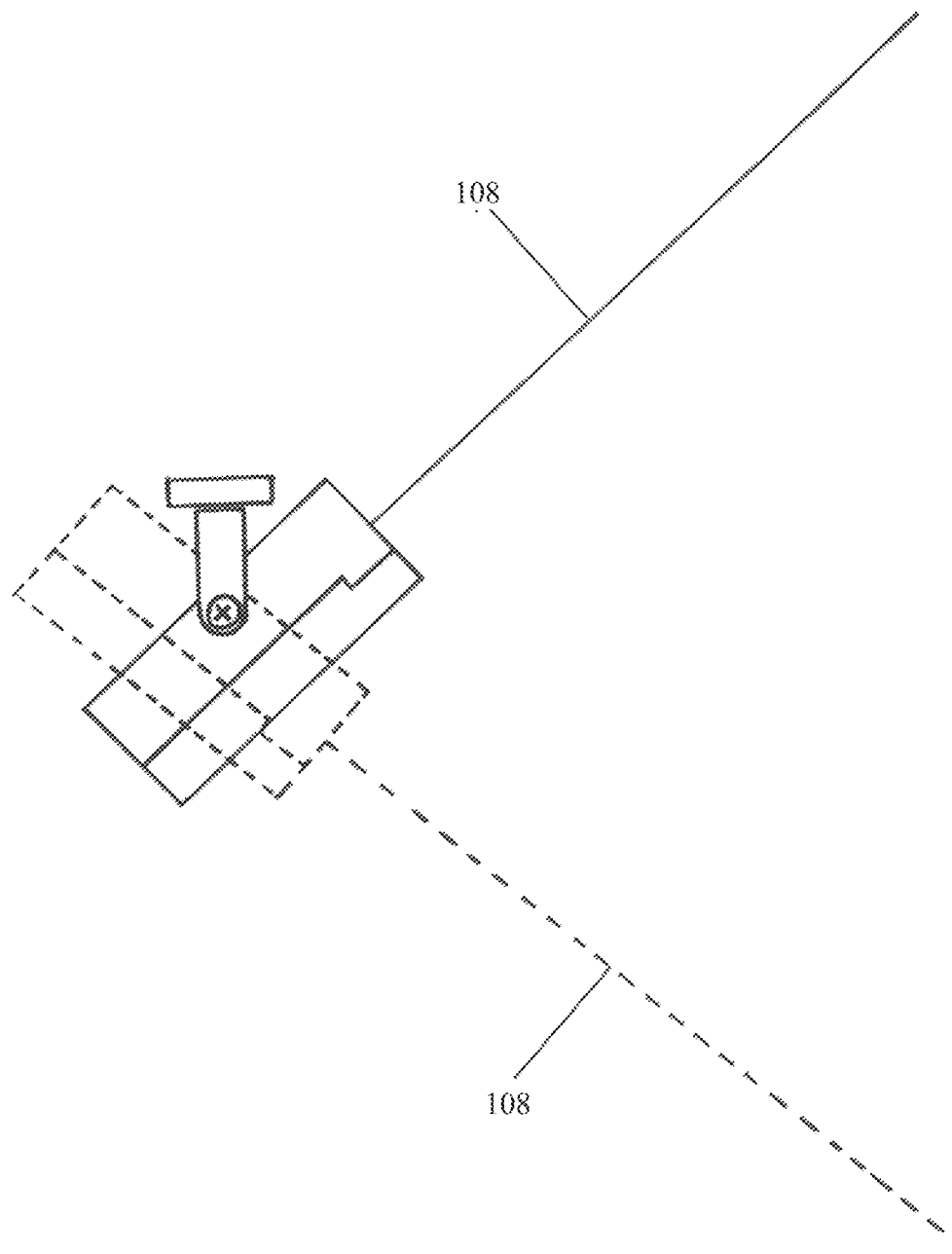
FIG. 3g represents a change in the zone of detection by rotational movement in the y-axis from a perspective (i.e. as viewed from the sensor) of one of the at least three sensors having an adhesion brim that is a pivot brim.
Figure 3H:
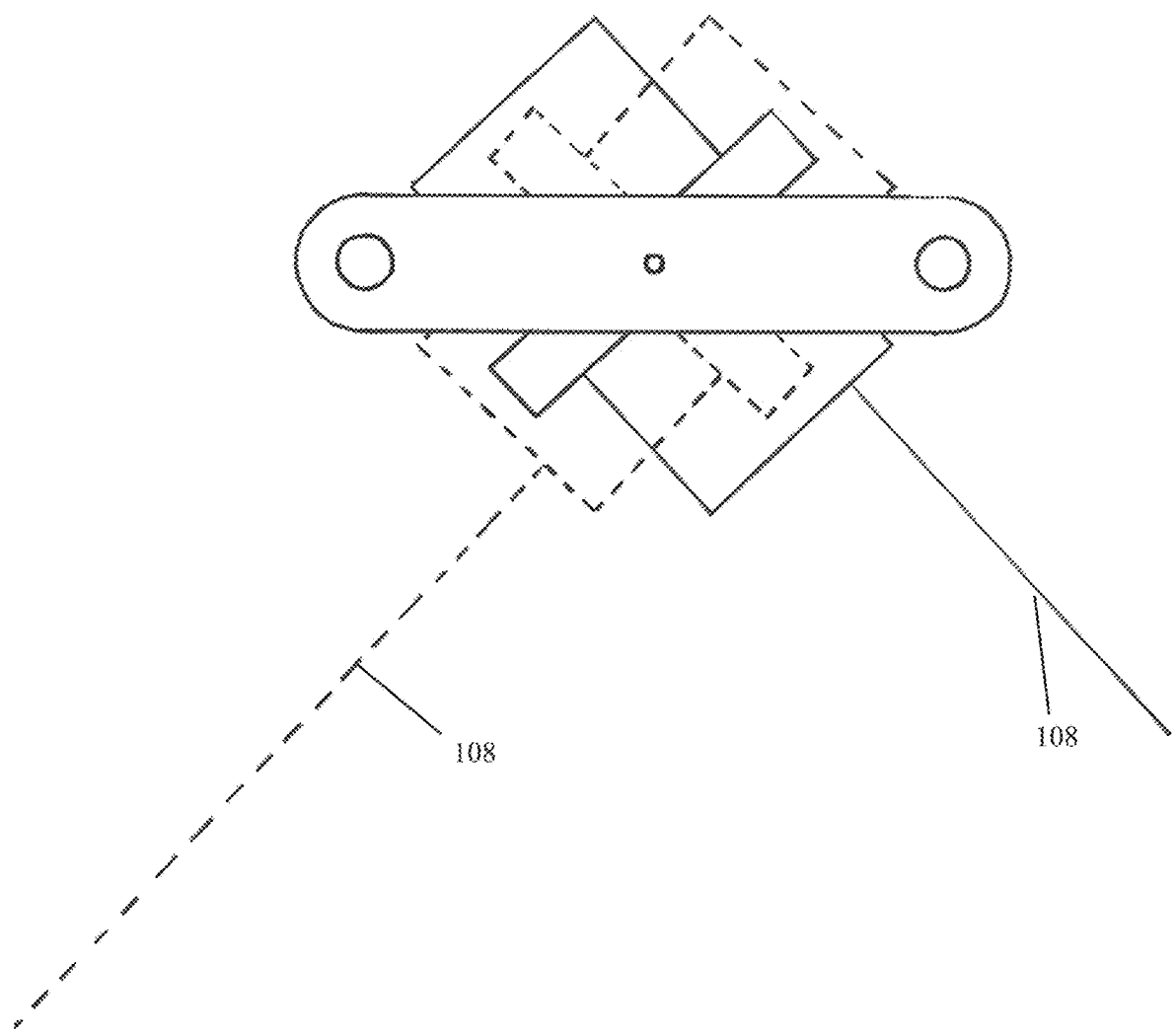
FIG. 3h represents a change in the zone of detection by rotational movement in the x-axis from a perspective (i.e. as viewed from the sensor) of one of the at least three sensors having an adhesion brim that is a pivot brim.

FIGS. 3b-3d represent the zone of detection 300 from a top, side, and rear view, respectively to show the zone of detection 300 in a conical manner. The transmission circumference 122 is the circumference of the conical area in which the receiver 105 may receive a transmission from the transmission fob 120 at the transmission depth 108 and is from 5.74 meters (18.84 feet) meters or less. The transmission circumference 122 may be modified by modifying the transmission depth 108 and/or the angle of the receiver 105 in relation to the vehicle 500. For example, it may be advantageous to modify the transmission circumference 122 to encourage a user of the 360 safety system to be in a certain position (i.e. kneeling) to successfully transmit a signal to the receiver for proper inspection of a portion of the vehicle 500 (for example, see the transmission circumferences in FIGS. 4c-4f). FIG. 3g. represents how the zone of detection 300 is modified as the sensor 102 pivots on an adhesion brim 106 that is a pivot brim.

Figure 4A:
FIG. 4a represents placements of the at least three sensors of the 360 safety system.
Figure 4B:
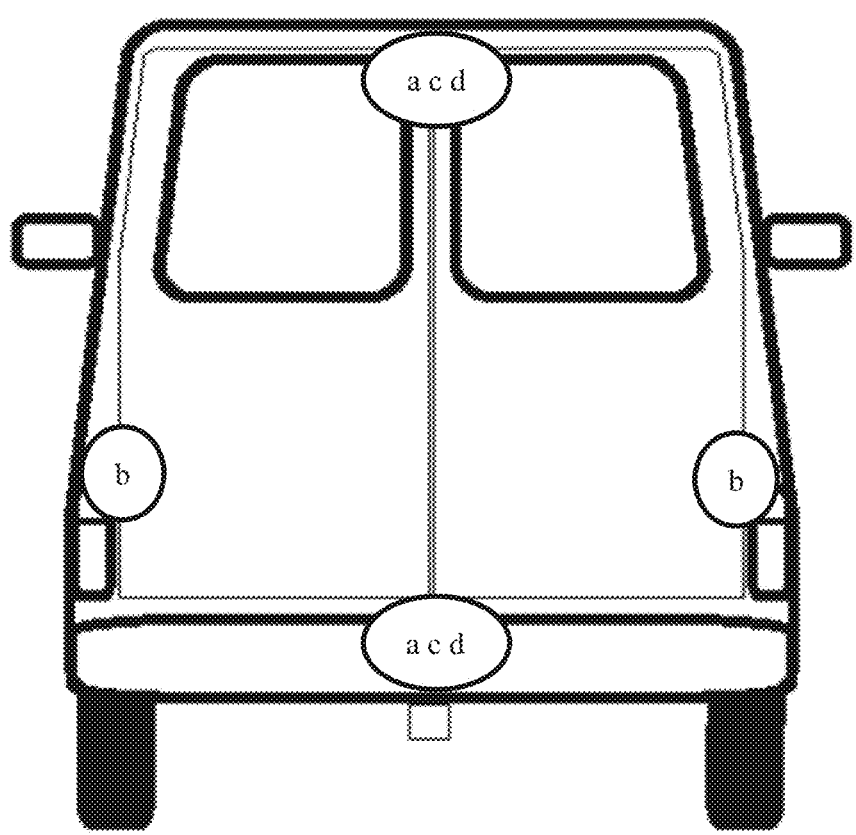
FIG. 4b represents placements of the at least three sensors of the 360 safety system.
Figure 4C:
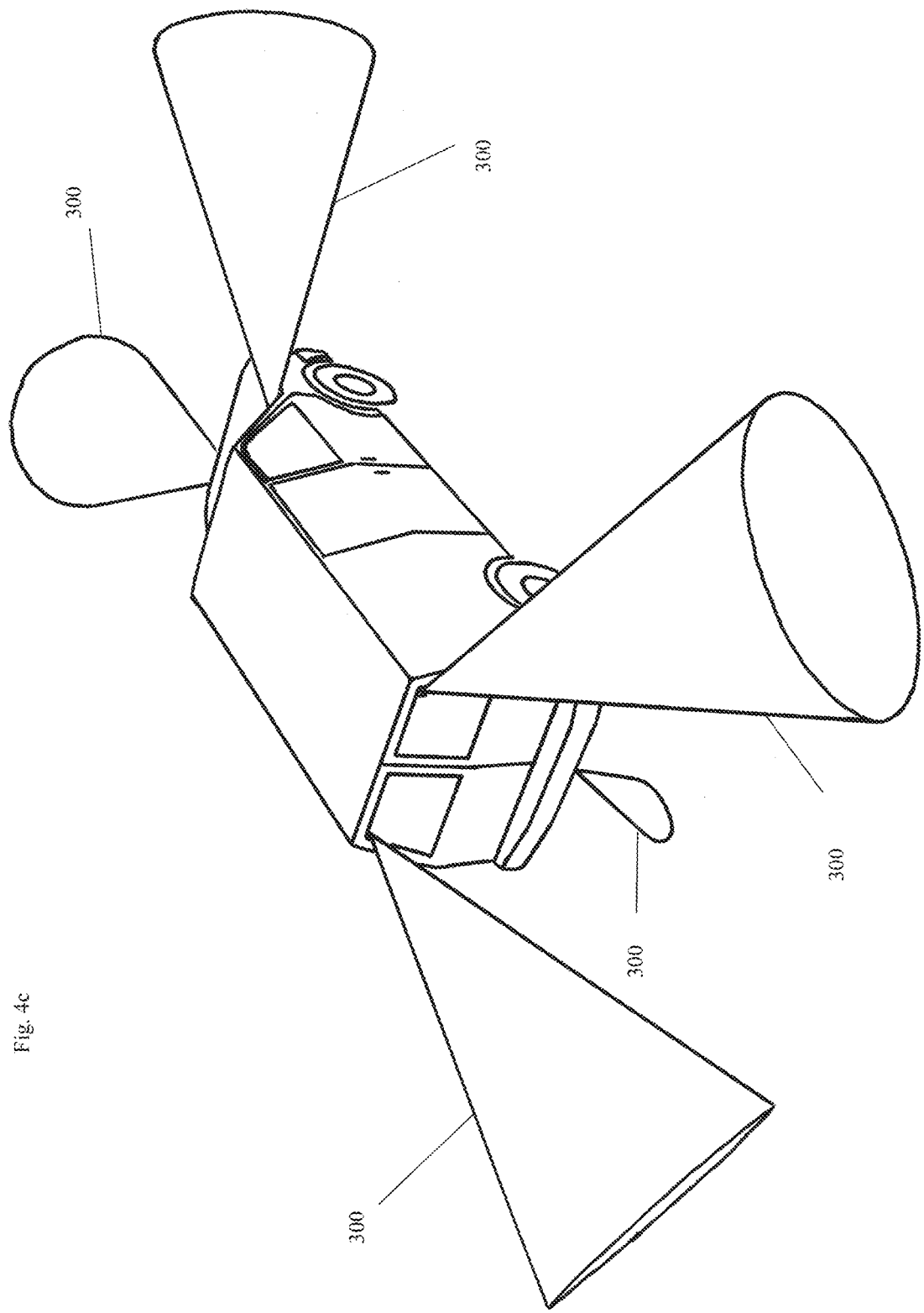
FIG. 4c represents a perspective view of a placement of five sensors of the 360 safety system.
Figure 4D:
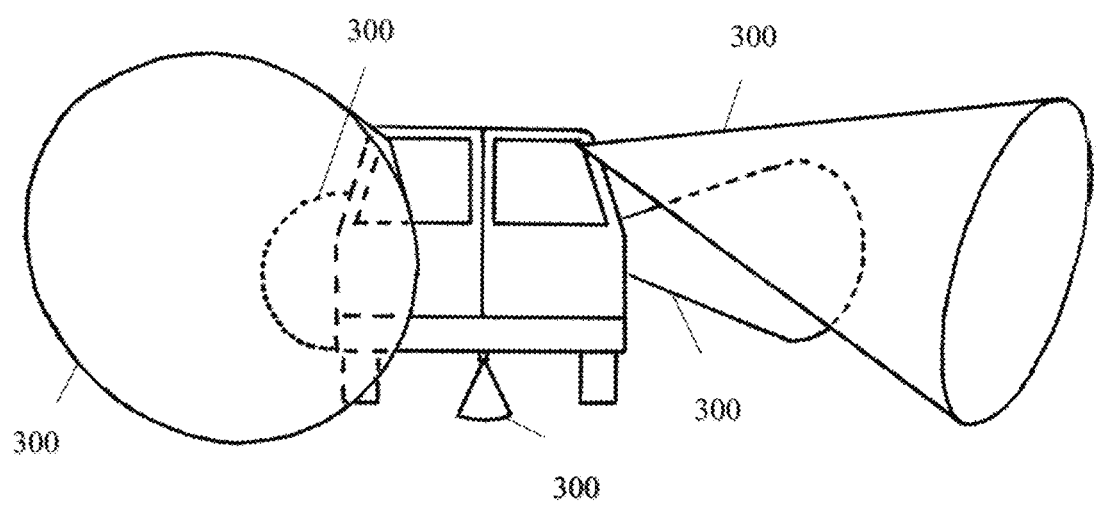
FIG. 4d represents a rear view of the placement of five sensors of the 360 safety system.
Figure 4E:
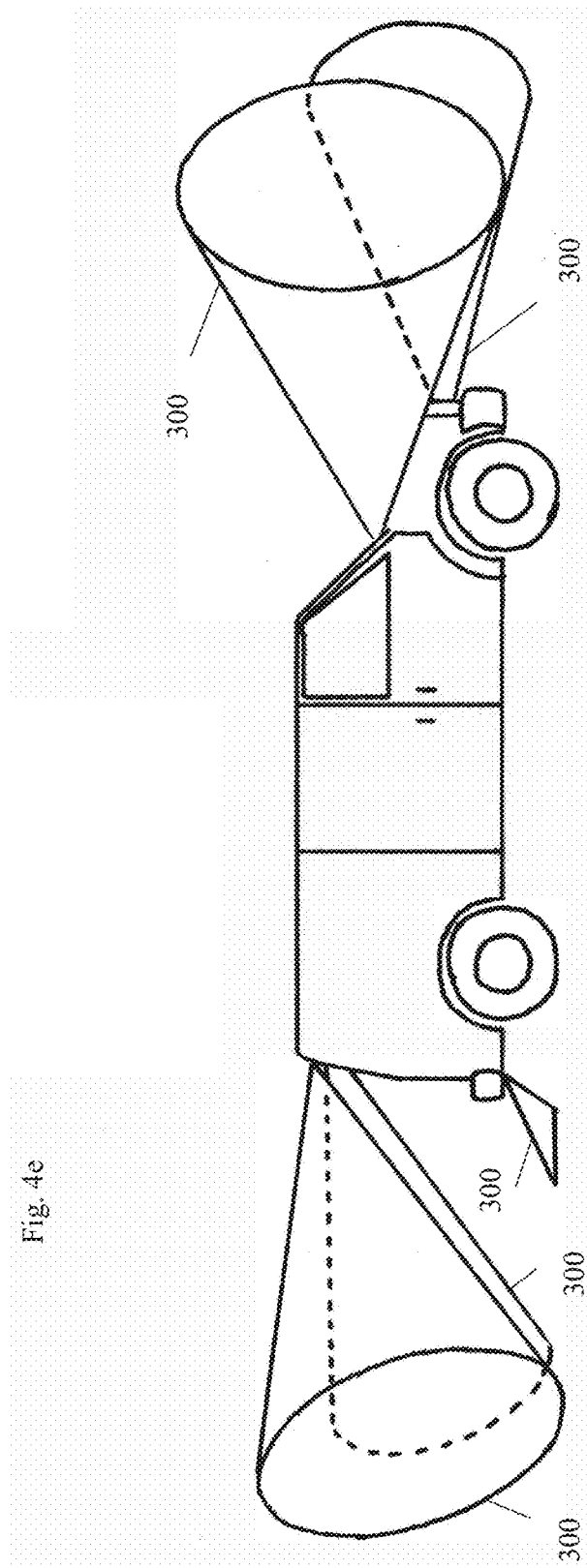
FIG. 4e represents a side view of the placement of five sensors of the 360 safety system.
Figure 4F:
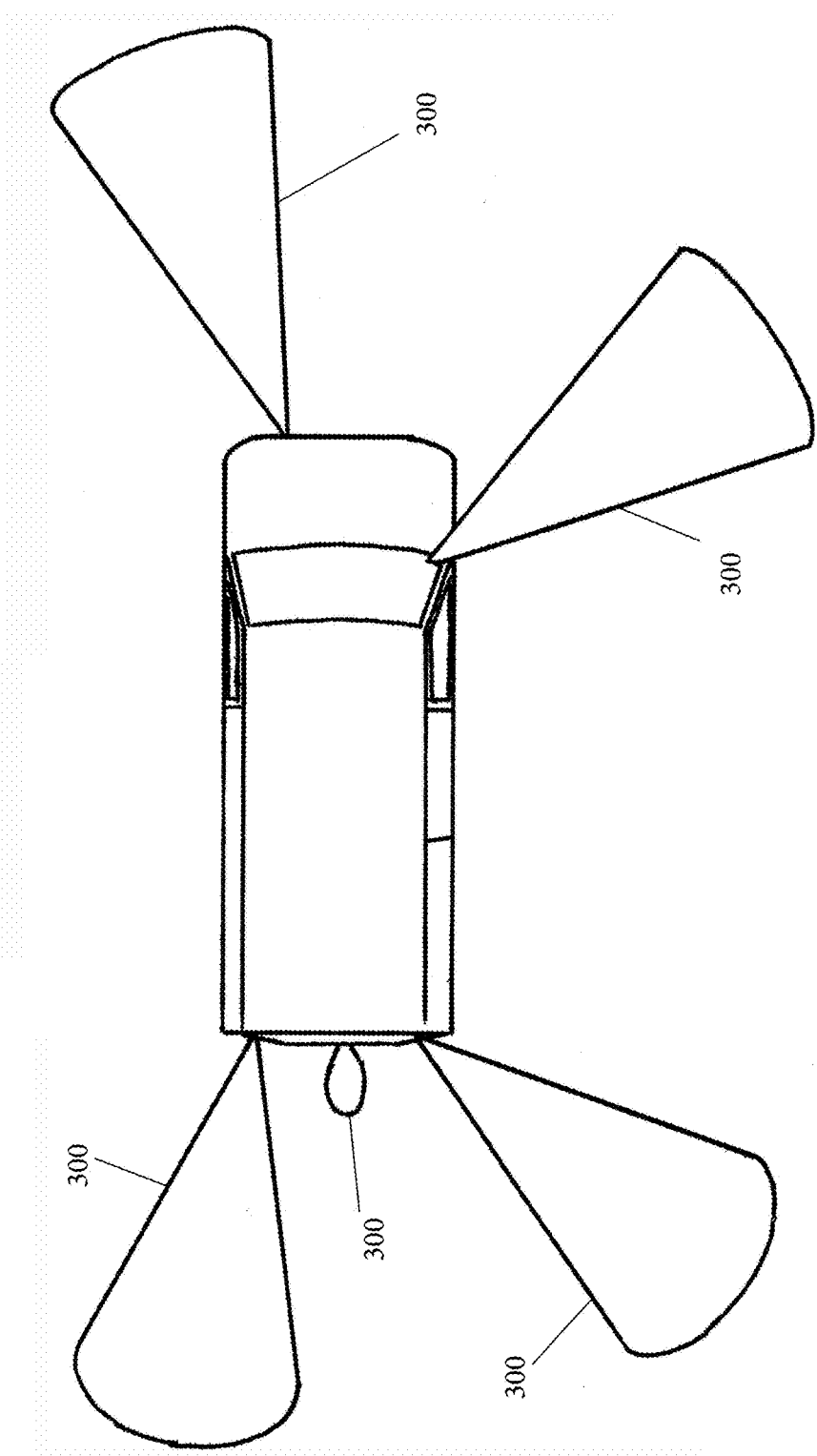
FIG. 4f represents a top view of the placement of five sensors of the 360 safety system.

FIGS. 4a and 4b represent the placement of the at least three sensors 102 on the vehicle 500. The placement of the at least three sensors 102 provides that the shortest distance to transmit a signal to each of the at least three sensors 102 and to arrive back at the driver's seat, is to take a 360 degree path around the vehicle 500. The placement of the at least three sensors 102 in connection with the zone of detection 300, transmission depth 108, and angle of the receiver 105 in relation to the vehicle 500 further provides that the signal is only received by one of the at least three sensors 102 at a time.

For example, the notation of "a" at each of the least three sensors 102 represents a first placement of the at least three sensors. The notation of "b" by each of the at least three sensors 102 represents a second placement of the at least three sensors. The notation of "c" by each of the at least three sensors 102 represents a third placement of the at least three sensors. The notation of "d" by each of the at least three sensors 102 represents a fourth placement of the at least three sensors.

FIGS. 4c-4f represent placement of five sensors 102 on a vehicle 500 from a perspective, rear, side, and top view respectively. The placement of the five sensors 102 in connection with the zone of detection 300, transmission depth 108, and transmission circumference 122 in relation to the vehicle 500 further provides that the signal is only received by one of the five sensors 102 at a time.

FIG. 5 represents the operating system 200 of the 360 safety system 100. The operating system 200 includes a CPU (central processing unit) 204, a HMI (human machine interface) 202, a key position input 210, a headlight detection input 211 (i.e. a headlight switch position input), the transmission fob 120, and the at least three sensors 102. The operating system may further include a power source 208, at least three sensor CPUs 114, an interrupt 212, and optional mobile device application 214.

The HMI 202 displays outputs from the CPU 204, such as display of an operation mode, operating system status, and prompts for user inputs. The HMI 202 further provides for user inputs, such as the selection of an operation mode and the entry of user access codes, administrator codes, and emergency override codes. The HMI may include a LCD, a LED, an OLED, a vacuum fluorescent, or other display adapted to show alpha-numeric readings. The HMI 202 electrically communicates with the CPU 204. The HMI 202 may be in hardwire electrical communication with the CPU 204. Alternatively, the HMI 202 may be in wireless electrical communication with the CPU 204, such as utilizing a wi-fi network, radio transceiver, or the like to electrically communicates with the CPU 204.

The at least three sensors 102 determine the detection of the signal from the transmission fob 120, and may be implemented as described herein. The at least three sensors 102 may be in hardwire electrical communication with the CPU 204 via the communication wire. Alternatively, the at least three sensors 102 may be in wireless electrical communication with the CPU 204, such as utilizing a wi-fi network, radio transceiver, or the like to electrically communicates with the CPU 204.

When the at least three sensors 102 include sensor CPUs 114 the at least three sensors 102 may be in hardwire electrical communication with the CPU 204 via the communication wire. The at least three sensor CPUs 114 may be in wireless communication with the CPU 204, such as utilizing a wi-fi network, radio transceiver, or the like to electrically communicates with the CPU 204. The sensor CPUs 114 are in hardwire electrical communication with the receiver 105 and LED 107 of the at least three sensors 102.

The key position input 210 determines the position of the key, transmitting a key position input to the CPU 204 when the key of the vehicle 500 is in the "on" position. No key position input is transmitted to the CPU 204 when the key of the vehicle 500 is in the "off" position. The key position input 210 is in electrical communication with the CPU 204.

The headlight detection input 211 determines whether the headlights are "on" or "off" transmitting a headlight input to the CPU 204. No headlight input is transmitted to the CPU 204 when the headlights are "off." The headlight detection input 211 is in electrical communication with the CPU 204. A headlight detection input 211 is transmitted to the CPU 204 when the headlights are "on".

The power source 208 is configured to power the CPU 204. The power source 208 may be a battery of the vehicle 205. The power source 208 is in electrical communication with the CPU 204.

The operating system 200 may include an interrupt 212 configured to provide a complete circuit when closed via an output from the CPU 204 upon the CPU 204 determination that the key of the vehicle 500 is in the "on" position and all of the at least three sensors 102 have received the signal from the transmission fob 120. The interrupt 212 may provide a complete circuit with the starter motor of the vehicle 500 when the 360 safety system 100 prevents ignition prior to the 360 walk-around. The interrupt 212 may provide a complete circuit with the gear shift solenoid of the vehicle 500 when the 360 safety system 100 prevents gear shifting prior to completion of the 360 walk-around. The interrupt 212 is in electrical communication with the CPU 204 and the vehicle 500. If the operating system did not include the interrupt 212, the vehicle could be engaged immediately.

The operating system 200 may include an optional mobile device application 514 configured to receive a 360 walk-around completion output from the CPU 204 via a network 216. An administrator may access the optional mobile device application 214 to view the data associated with the 360 walk-around completion outputs received by the optional mobile device application 214. The optional mobile device application 214 is configured for operation on a mobile device 520.

The mobile device 520 includes a mobile device processor and a mobile device storage medium, where the mobile device storage is communicatively coupled with the mobile device processor. The mobile device 520 may further include one or more user interface devices, such as a touch screen display, keyboard, or the like, which are communicatively coupled to the mobile device processor. The mobile device 520 is communicatively coupled to the CPU 204 via the network 216.

The network 216 provides connectivity between the optional mobile device application 214, the mobile device 520, and the CPU 204. The network 216 may be a wireless network. The network 216 may implement the Internet.

The CPU 204 includes a processor 502 and a storage medium 504, where the processor 502 and the storage medium 504 are communicatively coupled. The storage medium 504 may be an electrically erasable programmable read-only memory (EEPROM), a magnetic, optical, or semiconductor memory, another storage device, or the like. The storage medium 504 may be a fixed memory device, a removable memory device, such as a memory card, remotely accessed, or the like. Preferably the storage medium 504 is an EEPROM and is fixed in the CPU 204, where the EEPROM memory stores information without erasure in conditions where power is not supplied to the CPU 204. In this way, administrator codes, emergency override codes, and the number of emergency starts, or full overrides may be provided to an administrator of a 360 walk-around program to assess the status of the users of the 360 safety system 100.

The processor 502 determines when the key is in the "on" position and all of the at least three sensors 102 have received the signal from the transmission fob 120. The processor 502 may, in response to the determination that the key is in the "on" position and the at least three sensors 102 have received the signal, engage the vehicle 500 by supplying the appropriate instruction to close the interrupt 212 using computer readable non-transient software code and data stored in the storage medium 504.

Preferably, the operating system 200 via the computer readable non-transient software code and data stored in the storage medium 504 provides the processor 502 with at least four operating menus. The at least four operating menus include the administrator menu, the driver menu, the emergency menu, and the walk-around menu. The computer readable non-transient software code and data stored in the storage medium 504 may provide the processor 502 with additional operating menus.

Figure 7B:
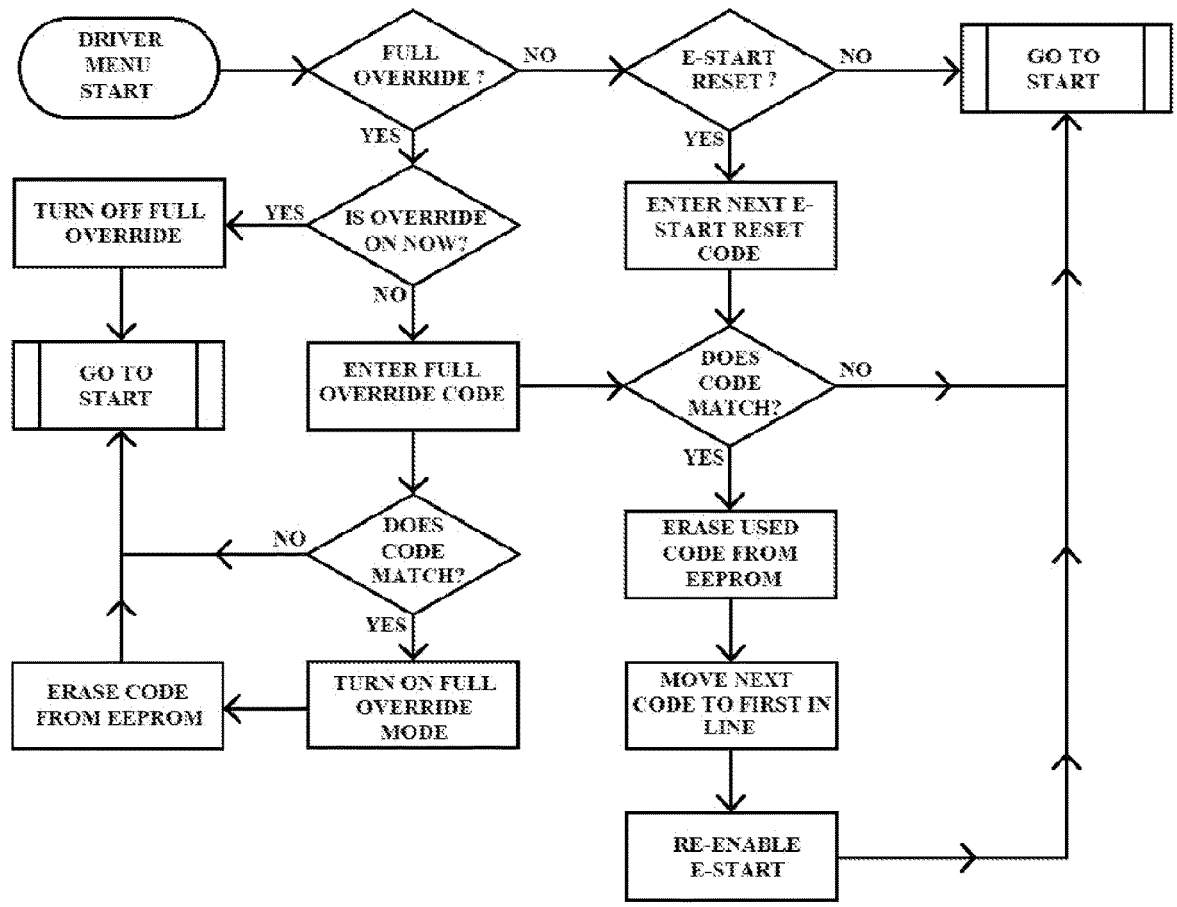

In the administrator menu of the operating system 200, the processor 502 may determine when an administrator code is entered in the HMI 202 to allow programming of emergency override codes, administrator codes, and user access codes into storage medium 504. For example, programming associated with entry of the administrator code may occur according to the flow chart of FIG. 7a Moving from left to right from the "ADMIN MENU START" the diamond blocks contain the following text: 1) "CHANGE ADMIN CODE?", 2) "ADD FULL OVERRIDE CODE?", and 3) "ADD E START RESET CODE?".

In the driver menu of the operating system 200, the processor 502 may also determine when a user selects the driver menu. When the driver menu is selected from the HMI 202 menu options of full override, reset emergency override, user preferences (e.g. sounds), sensor test, sensor activation, sensor deactivation may be performed. For example, selections and performance of actions associated with the driver menu may occur according to the flow chart of FIG. 7b. Moving from left to right from the "DRIVER MENU START" the diamond blocks contain the following text: 1) "FULL OVERRIDE?", and 2) "E-START RESET?". Moving from left to right from the "TURN OFF FULL OVERRIDE" block the diamond block reads "IS OVERRIDE ON NOW?". Moving from left to right from the "GO TO START" block, the diamond block reads "DOES CODE MATCH?". Moving from down from the "ENTER FULL OVERRIDE CODE" block the diamond block reads "DOES CODE MATCH?".

In the emergency menu of the operating system 200, the processor 502 may determine when an emergency override button of the HMI 202 is engaged via an emergency override input. The emergency override button permits for immediate and full engagement of the vehicle. Upon selection of the emergency override button, the CPU 204 validates availability of the emergency menu (i.e. where the emergency menu has not yet been selected after reset according to the administrator menu). Upon verification of availability of the emergency menu, the processor 502 supplies the appropriate instructions to the interrupt 212 using computer readable non-transient software code and data stored in the storage medium to engage the vehicle 500. The emergency override code is thereafter stored in the storage medium 504, such that reuse of the emergency override codes is not possible without resetting the emergency override code.

Figure 6:
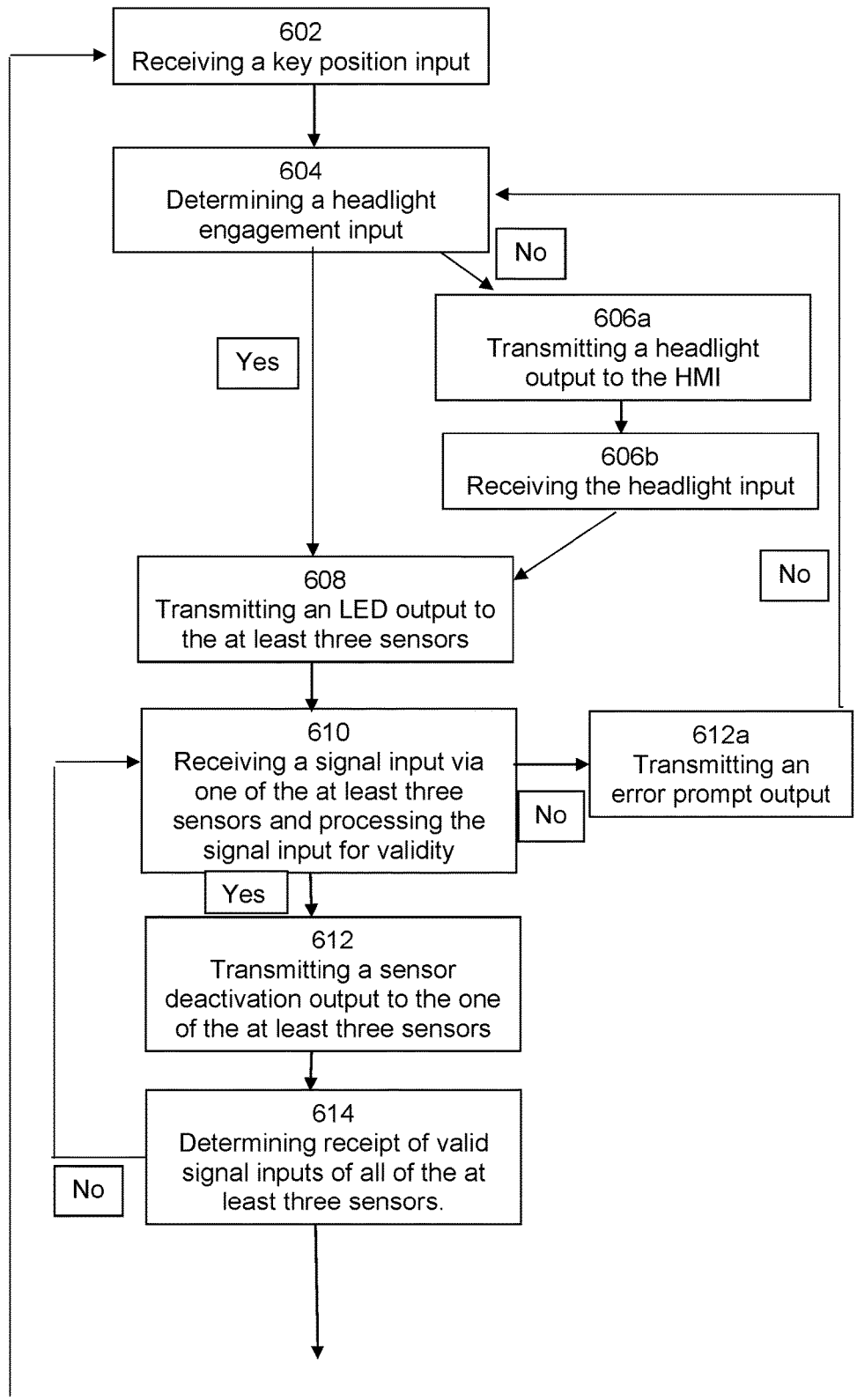
FIG. 6 represents a method of performing a 360 walk around 600.

In the walk around menu of the operating system 200 a 360 walk around is performed. FIG. 6 represents a method of performing a 360 walk around 600. In 602 receiving at the CPU 204 a key input from the key position input 210 when the key is in the "on" position. The key position input 210 is configured for causing the CPU 204 to process and store the key position input 210 using computer readable non-transient software code and data stored in the storage medium 504. The key position input 210 may further be configured for periodically transmitting (e.g. multiple times per second) when the key is in the "on" position for receipt by the CPU 204. The CPU may be configured to restart the walk-around in response to ceasing to receive the key input using computer readable non-transient software code and data stored in the storage medium 504.

In 604 in response to the key input, determining receipt of a headlight input at the CPU 204 from the headlight detection input 211. The headlight detection input 211 may be configured for continuously transmitting (e.g. multiple times per second) when the headlights are "on" for receipt by the CPU 204. The determining is configured to assess whether the CPU 204 is receiving the headlight engagement input from the headlight detection input 211 using computer readable non-transient software code and data stored in the storage medium 504. The CPU may be configured to restart the walk-around in response to ceasing to receive the headlight input using computer readable non-transient software code and data stored in the storage medium 504.

In 606a, in response to a negative determination that a headlight input has not been received and stored by the CPU 204, transmitting via the CPU 204 a headlight engagement output to the HMI 202 configured to display a prompt in text to turn on the headlights using computer readable non-transient software code and data stored in the storage medium 504. In 606b receiving at the CPU 204 the headlight input from the headlight detection input 211 configured for causing the CPU 204 to process and store the headlight input using computer readable non-transient software code and data stored in the storage medium 504.

In 608, in response to a positive headlight engagement input determination, transmitting via the CPU 204 an activation output to the at least three sensors 102 configured to activate the LED 107 and receiver 105 using computer readable non-transient software code and data stored in the storage medium 504. The activation output may be transmitted to the sensor CPU 114 of each of the at least three sensors 102 that is configured to have the sensor CPU 114 transmit an output to activate the LED 107 and receiver 105 using computer readable non-transient software code and data stored in the sensor storage medium 704.

In 610, receiving a signal input at the CPU 204 via one of the at least three sensors 102 in response to the receiver 105 receiving a signal from the transmission fob 120. The signal input may be via the sensor CPU 114 using computer readable non-transient software code and data stored in the sensor storage medium 704. The signal input configured for causing the CPU 204 to process the validity of the signal input and store a valid signal input using computer readable non-transient software code and data stored in the sensor storage medium 704. The CPU 204 processes the validity of the signal input by determining that the signal input was received from only one of the at least three sensors and stores a valid signal input in the CPU 204 using computer readable non-transient software code and data stored in the storage medium 504.

In 612, in response to the storage of the valid signal input, transmitting a sensor deactivation output to the sensor 102 from which the valid signal input was received configured to turn off the LED 107 and deactivate the receiver 105 using computer readable non-transient software code and data stored in the storage medium 504. The sensor deactivation output may be transmitted to the sensor CPU 114 configured to have the sensor CPU 114 transmit the sensor deactivation output to turn off the LED 107 and deactivate the receiver 105 using computer readable non-transient software code and data stored in the storage medium 704.

In 612a, in response to an invalid signal input where the CPU 204 determines the signal input was received by more than one of the at least three sensors 102, transmitting an error prompt output configured to reset each of the at least three sensors 102 (which may further include configuration to flash the LED 107) and configured to cause the HMI 202 to display text prompting restart (which may further include configuration to display text prompting the headlights to be turned off then on) of the 360 walk around at 602 using computer readable non-transient software code and data stored in the storage medium 504.

In 614 in response to the transmission of the sensor deactivation output, determining via the CPU 204 if valid signal inputs have been stored for all of the at least three sensors 102. If the determination is negative, the CPU 204 will await receiving a signal input at 610 from another of the at least three sensors 102. If the determination is positive the CPU 204 is configured to store the completion of the 360 walk around using computer readable non-transient software code and data stored in the storage medium 504.

In 616, in response to the storage of the completion of the 360 walk around, transmitting an interrupt output via the CPU 204 to close the interrupt 212 using computer readable non-transient software code and data stored in the storage medium 504.

In 618, simultaneously or nearly simultaneously with the interrupt output transmission, transmitting a timer output via the CPU 204 to the HMI 202 configured to start a timer and display a timer to count down the amount of time, from 5 minutes or less, in which the interrupt 212 remains closed. The vehicle 500 may be engaged at any time before the timer counts down to zero.

In 620, in response to the timer counting down to zero, receiving a timer expiration input at the CPU 204 configured to reset the 360 walk around by opening the interrupt 212. When the interrupt circuit 212 is open after the vehicle 500 is in gear movement and shifting of the vehicle is not inhibited until the vehicle is shifted back into park.

In 622, in response to the timer expiration input, transmitting via the CPU 204 a timer expiration output to the interrupt 212 configured for opening the interrupt 212.

The invention claimed is:

1. A 360 safety system to verify safety of a regulated vehicle by completing a 360 walk-around prior to engaging the regulated vehicle, the 360 safety system comprising:
a regulated vehicle having headlights;
at least three sensors removably attached to the regulated vehicle, the at least three sensors each comprising
a bracket having a bracket opening and a bracket depth,
a receiver having a transmission depth, where the transmission depth is the distance from 3.05 meters or less that the receiver receives a signal from a transmission fob, wherein
the receiver is housed by the bracket distal to and centered within the bracket opening,
an adhesion brim for removable attachment of the adhesion brim to the regulated vehicle; and
a zone of detection formed by two angles and the transmission depth, the two angles comprising the two angles from a centerline of the receiver and the bracket opening, where the two angles are each from 16.7 degrees or less, wherein
each of the zones of detection of the at least three sensors do not overlap, where only the receiver of one of the at least three sensors receives the signal transmitted from the transmission fob within the zone of detection of the receiver; and
an operating system configured to operate the 360 safety system, the operating system comprising
a CPU (central processing unit) having a processor and a storage medium, the CPU in electrical communication with the at least three sensors configured to receive, process, and store signal inputs from the at least three sensors,
receive, process, and store user inputs from a HMI (Human-Machine Interface),
receive and process a key input from a key position input,
receive and process a headlight input from a headlight detection input,
provide an interrupt output to an interrupt, and
provide outputs to the HMI;
the HMI in electrical communication with the CPU configured to receive inputs for transmission to the CPU and display outputs from the CPU;
the key position input configured to determine and transmit the position of a key of the regulated vehicle via the key input to the CPU;
the headlight detection input configured to determine and transmit the headlight input of the regulated vehicle to the CPU when the regulated vehicle's headlights are on; and
an interrupt configured to provide a complete circuit when closed via the interrupt output from the CPU upon completion of a 360 walk-around to engage the regulated vehicle, where the interrupt is in electrical communication with the CPU, wherein the interrupt is further configured to provide the complete circuit with a gear shift solenoid of the regulated vehicle, where shifting of the regulated vehicle is prevented until completion of the 360 walk-around.

2. A method of operating a 360 safety system to verify safety of a regulated vehicle by completing a 360 walk-around prior to engaging the regulated vehicle, the method comprising:
initiating a 360 walk-around of a 360 safety system by receiving a key input at a CPU (central processing unit) of an operating system of the 360 safety system, the 360 safety system comprising
a regulated vehicle having headlights;
at least three sensors removably attached to the regulated vehicle, the at least three sensors each comprising
a bracket having a bracket opening and a bracket depth,
a receiver having a transmission depth, where the transmission depth is the distance from 3.05 meters or less that the receiver receives a signal from a transmission fob, wherein the receiver is housed by the bracket distal to and centered within the bracket opening,
a light emitting diode (LED); and
a means for removable attachment to the regulated vehicle; and
a zone of detection formed by two angles and the transmission depth, the two angles comprising the two angles from a centerline of the receiver and the bracket opening, where the two angles are each from 16.7 degrees or less, wherein
each of the zones of detection of the at least three sensors do not overlap, where only the receiver of one of the at least three sensors receives the signal transmitted from the transmission fob within the zone of detection of the receiver; and
the operating system configured to operate the 360 safety system, the operating system comprising
the CPU having a processor and a storage medium, the CPU in electrical communication with the at least three sensors;
an HMI (Human-Machine Interface) in electrical communication with the CPU configured to receive timer expiration inputs for transmission to the CPU and display timer expiration outputs from the CPU;

a key position input configured to determine and transmit the position of a key of the regulated vehicle via a key input to the CPU;

a headlight detection input configured to determine and transmit a headlight input of the regulated vehicle to the CPU in response to the headlights of the regulated vehicle being on; and an interrupt configured to provide a complete circuit when closed via an interrupt output from the CPU upon completion of the 360 walk-around to engage the regulated vehicle, where the interrupt is in electrical communication with the CPU;

determining receipt of the headlight input from the headlight detection input at the CPU;

transmitting via the CPU an activation output to the at least three sensors configured to activate the LED and the receiver;

receiving a first signal input at the CPU via a first of the at least three sensors, the first signal input configured for causing the CPU to process the validity of the first signal input and store a valid first signal input in the CPU;

transmitting a first sensor deactivation output via the CPU to the first sensor of the at least three sensors configured to deactivate the first of the at least three sensors;

receiving a second signal input at the CPU via a second of the at least three sensors, the second signal input configured for causing the CPU to process the validity of the second signal input and store a valid second signal input in the CPU;

transmitting a second sensor deactivation output via the CPU to the second sensor of the at least three sensors configured to deactivate the second of the at least three sensors;

receiving a third signal input at the CPU via a third of the at least three sensors, the signal input configured for causing the CPU to process the validity of the third signal input and store a valid third signal input in the CPU;

transmitting a third sensor deactivation output via the CPU to the third sensor of the at least three sensors configured to deactivate the third of the at least three sensors;

determining the first valid signal input, second valid signal input, and third valid signal input are stored in the CPU, the determining configured to store the completion of the 360 walk-around in the CPU; and transmitting an interrupt output to the interrupt via the CPU configured to close the interrupt circuit allowing engagement of the regulated vehicle, wherein the interrupt is configured to provide a complete circuit with a gear shift solenoid of the regulated vehicle, where ignition of the regulated vehicle is prevented until completion of the 360 walk-around.

3. The method of claim 2, further comprising

Transmitting simultaneously with the transmission of the interrupt output a timer output via the CPU to the HMI to start and display a timer for from five minutes or less;

Receiving a timer expiration input at the CPU configured to open the interrupt circuit;

Transmitting a timer expiration output to the interrupt circuit configured to open the interrupt circuit.

* * * * *